(12) United States Patent
Baba et al.

(10) Patent No.: US 7,992,032 B2
(45) Date of Patent: Aug. 2, 2011

(54) CLUSTER SYSTEM AND FAILOVER METHOD FOR CLUSTER SYSTEM

(75) Inventors: Tsunehiko Baba, Hachioji (JP); Toshiomi Moriki, Kokubunji (JP); Yuji Tsushima, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 539 days.

(21) Appl. No.: 11/882,700

(22) Filed: Aug. 3, 2007

(65) Prior Publication Data

US 2008/0263390 A1    Oct. 23, 2008

(30) Foreign Application Priority Data

Apr. 20, 2007  (JP) .................................. 2007-112056

(51) Int. Cl.
*G06F 11/00* (2006.01)
(52) U.S. Cl. ................................. 714/3; 714/11; 714/13
(58) Field of Classification Search .................. 714/3, 4, 714/11, 13
See application file for complete search history.

(56) References Cited

U.S. PATENT DOCUMENTS

| | | | |
|---|---|---|---|
| 6,728,896 B1* | 4/2004 | Forbes et al. ...................... | 714/4 |
| 6,985,937 B1 | 1/2006 | Keshav et al. | |
| 7,487,390 B2* | 2/2009 | Saika ............................... | 714/13 |
| 7,809,976 B2* | 10/2010 | Goodson et al. ................... | 714/3 |
| 2005/0198327 A1* | 9/2005 | Iwamura et al. .............. | 709/229 |
| 2006/0195715 A1* | 8/2006 | Herington ......................... | 714/4 |
| 2008/0126834 A1* | 5/2008 | Sankaran et al. .................. | 714/4 |
| 2008/0270825 A1* | 10/2008 | Goodson et al. ................... | 714/6 |
| 2009/0119538 A1* | 5/2009 | Scales et al. ..................... | 714/6 |
| 2009/0138752 A1* | 5/2009 | Graham et al. ..................... | 714/4 |
| 2009/0138753 A1* | 5/2009 | Tameshige et al. ............... | 714/4 |
| 2011/0010706 A1* | 1/2011 | Lambert et al. .................... | 718/1 |

OTHER PUBLICATIONS

"VMware® server integral solution employing CLUSTERPRO®", Dynamic Collaboration, pp. 1-28 in Japanese with English translation pp. 1-28.

* cited by examiner

*Primary Examiner* — Philip Guyton
(74) *Attorney, Agent, or Firm* — Stites & Harbison PLLC; Juan Carlos A. Marquez, Esq.

(57) ABSTRACT

Even when a large number of guest OSs exist, a failover method meeting high availability needed by the guest OSs is provided for the each guest OS. In the event of a physical or logical change of a system, or change of operation states, a smooth failover method can be realized by preventing the consumption of resource amounts due to excessive failover methods, and the occurrence of systemdown due to an inadequate failover method. In a server virtualization environment, in a cluster configuration having a failover method due to hot standby and cold standby, by selecting a failover method meeting high availability requirements specifying performance during failover of applications on the guest OSs, a suitable cluster configuration is realized. Failure monitoring is realized by quantitative heartbeat.

17 Claims, 30 Drawing Sheets

SHARED DISK

- 41 — AP1 ACTIVE SYSTEM ACTIVATION DISK 1
- 43 — AP2 ACTIVE SYSTEM ACTIVATION DISK 2
- 42 — AP1 STANDBY SYSTEM ACTIVATION DISK 3
- 44 — AP2 STANDBY SYSTEM ACTIVATION DISK 4
- 40

| IDENTIFIER | | OPERATION STATUS |
|---|---|---|
| AP1 | ONL | Status OK |
| | SBY | Status OK |
| AP2 | ONL | Status OK |
| HOST OS A | | Status OK |
| HOST OS B | | Status OK |
| GUEST OS 1 | | Status OK |
| GUEST OS 2 | | Status OK |
| GUEST OS 3 | | Status OK |

FAILOVER STATE MANAGEMENT TABLE (1001, 1002)

FIG. 6

| | | AP1 1111 | | AP2 1112 | |
|---|---|---|---|---|---|
| 1101 | AP IDENTIFIER | | | | |
| 1102 | HA CONFIGURATION | HOT STANDBY | | COLD STANDBY | |
| 1103 | FAILOVER STATE | ONL | SBY | ONL | SBY |
| 1104 | PHYSICAL COMPUTER | PHYSICAL COMPUTER A | PHYSICAL COMPUTER B | PHYSICAL COMPUTER A | PHYSICAL COMPUTER B |
| 1105 | LPAR | LPAR 1 | LPAR 3 | LPAR 2 | — |
| 1106 | HOST OS INFORMATION | HOST OS A | HOST OS B | HOST OS A | — |
| 1107 | GUEST OS INFORMATION | GUEST OS 1 | GUEST OS 3 | GUEST OS 2 | — |
| 1108 | ACTIVATION DISK | ACTIVATION DISK 1 | ACTIVATION DISK 3 | ACTIVATION DISK 2 | — |

FAILOVER CORRESPONDENCE TABLE

FIG. 7

| TARGET: AP1 (LPAR1) | | #1 | #2 | #3 | #4 | #5 |
|---|---|---|---|---|---|---|
| FAILURE RECOVERY METHOD | | Cold (Reboot) | Cold | Cold | Hot | Hot |
| FAILOVER DESTINATION SELECTION LOCATION | COMPUTER | COMPUTER A | COMPUTER A | COMPUTER B | COMPUTER A | COMPUTER B |
| | LPAR | IDENTICAL LPAR | DIFFERENT LPAR | DIFFERENT LPAR | DIFFERENT LPAR | DIFFERENT LPAR |
| RECOVERABLE FAILURE RANGE | AP | ○ | ○ | ○ | ○ | ○ |
| | GUEST OS | ○ | ○ | ○ | ○ | ○ |
| | HOST OS | × | × | ○ | × | ○ |
| | COMPUTER | × | × | ○ | × | ○ |
| FAILOVER TIME | | 60 SEC | 90 SEC | 100 SEC | 10 SEC | 10 SEC |
| HA CONFIGURATION SELECTABLE OR NOT | | SELECTABLE | SELECTABLE | SELECTABLE | SELECTABLE | BEING SELECTED |

HA CONFIGURATION PATTERN TABLE

FIG. 8

HA REQUIREMENT DEFINITION INPUT SCREEN (LPAR)

| | AP IDENTIFIER | AP1 ▼ — 2011 | | |
|---|---|---|---|---|
| 2001 | | HA REQUIREMENT TYPE — 2012 | HA REQUIREMENTS — 2013 | PRIORITY — 2014 |
| | CONDITION 1 | AP HALT PERMISSIBLE TIME ▼ | 150 SEC ▼ | PRIORITY 1 ▼ |
| | CONDITION 2 | FAILOVER METHOD ▼ | HOT STANDBY ▼ | PRIORITY 2 ▼ |

HA REQUIREMENT DEFINITION INPUT SCREEN (SYSTEM)

| | | HA REQUIREMENT TYPE | HA REQUIREMENTS | PRIORITY |
|---|---|---|---|---|
| 2101 | CONDITION 1 | AP PRIORITY ▼ | AP2, AP1 ▼ | PRIORITY A ▼ |

2201 — [CONDITION ADDED] [CONDITION DELETED]    [CANCEL] [RUN]

RUN RESULT

HA CONFIGURATION OF AP1 HAS BEEN SET

2301 — SETTING:
TARGET AP            AP1 (ACTIVE LPAR1)
HA CONFIGURATION     HOT STANDBY
FAILOVER DESTINATION PHYSICAL HOUSING B, STANDBY SYSTEM LPAR3
FAILOVER TIME        10 SEC

2401 —                            [HA REQUIREMENT CHANGE] [OK]

FIG. 9

| | AP IDENTIFIER | AP1 | | AP2 | | PRIORITY OF ENTIRE SYSTEM |
|---|---|---|---|---|---|---|
| 1301 | AP IDENTIFIER | AP1 | | AP2 | | — |
| 1302 | LPAR IDENTIFIER | LPAR 1 | | LPAR 2 | | — |
| 1303 | AP HALT PERMISSIBLE TIME | 150 SEC | PRIORITY 1 | 110 SEC | PRIORITY 1 | — |
| 1304 | FAILOVER METHOD PRIORITY | HOT STANDBY PRIORITY | PRIORITY 2 | COLD STANDBY PRIORITY | PRIORITY 2 | — |
| 1305 | AP PRIORITY | SECOND | | FIRST | | PRIORITY A |

HA REQUIREMENT DEFINITION

FIG. 17

| AP | | AP1 | AP2 |
|---|---|---|---|
| HOT STANDBY | STANDBY SYSTEM INSTALL INFORMATION | SHARED DISK PROVIDED | SHARED DISK PROVIDED |
| | | IP ADDRESS TAKEOVER | IP ADDRESS TAKEOVER |
| | | SETTING SCRIPT AP1.sh | SETTING SCRIPT AP2.sh |
| | STANDBY SYSTEM IMAGE | STANDBY SYSTEM IMAGE 1 | STANDBY SYSTEM IMAGE 2 |

| COMPUTER | PHYSICAL COMPUTER A | PHYSICAL COMPUTER B |
|---|---|---|
| 1401 — | | |
| 1402 — POWER CONSUMPTION | 200W | 180W |
| 1403 — CPU TYPE | CPU Type A (3.0GHz) | CPU Type B (2.4GHz) |
| 1404 — NIC TYPE | NIC Type A | NIC Type B |
| 1405 — HBA TYPE | HBA Type A | NIC Type B |
| 1406 — ALL PHYSICAL MEMORY CAPACITY | 3GB | 2GB |
| 1407 — HOUSING POWER | ON | ON |
| 1408 — EMPTY MEMORY CAPACITY | 2GB | 1GB |
| 1409 — AVAILABLE MEMORY CAPACITY | 1GB (LPAR1) | 1GB (LPAR3) |
|  |  | — |
| 1410 — HOST OS | HOST OS A | HOST OS B |
| 1411 — LPAR | LPAR 1 | LPAR 3 |
| 1412 — GUEST OS | GUEST OS 1 | GUEST OS 3 |
| 1413 — AP | AP 1 | AP 1 |

*(Row 1401 header: COMPUTER | PHYSICAL COMPUTER A | PHYSICAL COMPUTER B)*

FIG. 21

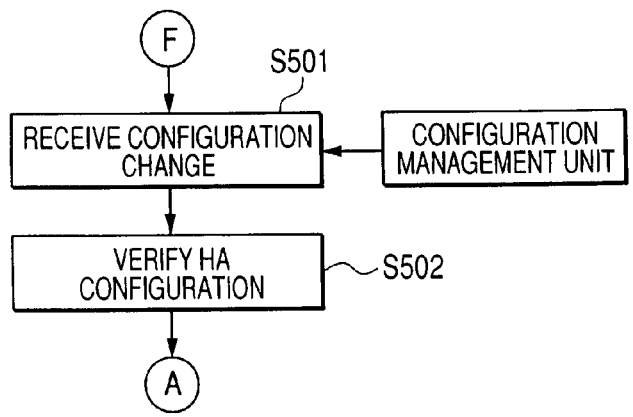

FIG. 22

HA REQUIREMENT DEFINITION INPUT SCREEN (LPAR)

2001 — AP IDENTIFIER: AP2 — 2011

| | HA REQUIREMENT TYPE (2012) | HA REQUIREMENTS (2013) | PRIORITY (2014) |
|---|---|---|---|
| CONDITION 1 | AP HALT PERMISSIBLE TIME | 150 SEC | PRIORITY 1 |
| CONDITION 2 | FAILOVER METHOD | COLD STANDBY | PRIORITY 2 |

HA REQUIREMENT DEFINITION INPUT SCREEN (SYSTEM)

| | HA REQUIREMENT TYPE | HA REQUIREMENTS | PRIORITY |
|---|---|---|---|
| 2101 — CONDITION 1 | AP PRIORITY | AP2, AP1 | PRIORITY A |

2201 — [CONDITION ADDED] [CONDITION DELETED]     [CANCEL] [RUN]

RUN RESULT

HA CONFIGURATION OF AP1 HAS BEEN SET

2301 —
BEFORE CHANGE:
- TARGET AP: AP1 (ACTIVE LPAR1)
- HA CONFIGURATION: HOT STANDBY
- FAILOVER DESTINATION: PHYSICAL HOUSING B, STANDBY SYSTEM LPAR3
- FAILOVER TIME: 10 SEC

AFTER CHANGE:
- TARGET AP: AP1 (ACTIVE LPAR1)
- HA CONFIGURATION: COLD STANDBY
- FAILOVER DESTINATION: PHYSICAL HOUSING A OR PHYSICAL HOUSING B
- FAILOVER TIME: 130 SEC

2401 —     [HA REQUIREMENT CHANGE] [OK]

FIG. 23

ALERT

HA CONFIGURATION OF DIFFERENT LPAR HAS BEEN CHANGED

2501 — BEFORE CHANGE:
| | |
|---|---|
| TARGET AP | AP1 (ACTIVE LPAR1) |
| HA CONFIGURATION | HOT STANDBY |
| FAILOVER DESTINATION | PHYSICAL HOUSING B, STANDBY SYSTEM LPAR3 |
| FAILOVER TIME | 10 SEC |

AFTER CHANGE:
| | |
|---|---|
| TARGET AP | AP1 (ACTIVE LPAR1) |
| HA CONFIGURATION | COLD STANDBY |
| FAILOVER DESTINATION | PHYSICAL HOUSING A OR PHYSICAL HOUSING B |
| FAILOVER TIME | 130 SEC |

2401 — [HA REQUIREMENT CHANGE] [OK]

HA REQUIREMENT DEFINITION (AP1)

2601 —
| | HA REQUIREMENT TYPE | HA REQUIREMENTS | PRIORITY |
|---|---|---|---|
| CONDITION 1 | AP HALT PERMISSIBLE TIME | 150 SEC | PRIORITY 1 |
| CONDITION 2 | FAILOVER METHOD SPECIFICATION | HOT STANDBY PRIORITY | PRIORITY 2 |

FIG. 25

| # | TARGET | | | BREAKDOWN | | VALUE |
|---|---|---|---|---|---|---|
| 1 | PHYSICAL COMPUTER A | LPAR 3 | GUEST OS 1 | HOT STANDBY FROM LPAR1 TO LPAR3 | AP FAILURE RECOVERY TIME | 8 SEC |
| 2 | PHYSICAL COMPUTER A | LPAR 1 | GUEST OS 1 | RESPONSE PERFORMANCE | | 3.7 SEC |
| | | | | I/O PERFORMANCE | | 5.1MB/s |
| 3 | PHYSICAL COMPUTER B | LPAR 1 | GUEST OS 1 | HOT STANDBY FROM LPAR3 TO LPAR1 | AP FAILURE RECOVERY TIME | 6 SEC |
| 4 | PHYSICAL COMPUTER A | LPAR 2 | GUEST OS 2 | RESPONSE PERFORMANCE | | 10.5 SEC |
| | | | | I/O PERFORMANCE | | 8.2MB/s |
| 5 | PHYSICAL COMPUTER A | LPAR 1 | GUEST OS 1 | HOT STANDBY FROM LPAR1 TO LPAR3 | AP FAILURE RECOVERY TIME | 7 SEC |
| 6 | PHYSICAL COMPUTER A | LPAR 2 | GUEST OS 2 | COLD STANDBY FROM LPAR4 TO LPAR2 | OS ACTIVATION TIME | 18 SEC |
| 7 | PHYSICAL COMPUTER A | LPAR 1 | GUEST OS 1 | RESPONSE PERFORMANCE | | 3.5 SEC |
| | | | | I/O PERFORMANCE | | 4.3MB/s |
| 8 | PHYSICAL COMPUTER A | LPAR 2 | GUEST OS 2 | COLD STANDBY FROM LPAR4 TO LPAR2 | AP ACTIVATION TIME | 11 SEC |
| 9 | PHYSICAL COMPUTER A | LPAR 2 | GUEST OS 2 | COLD STANDBY FROM LPAR4 TO LPAR2 | AP FAILURE RECOVERY TIME | 18 SEC |
| 10 | PHYSICAL COMPUTER A | LPAR 2 | | MAXIMUM CPU UTILIZATION RATIO | | 60% |

1501 / 1502 / 1503

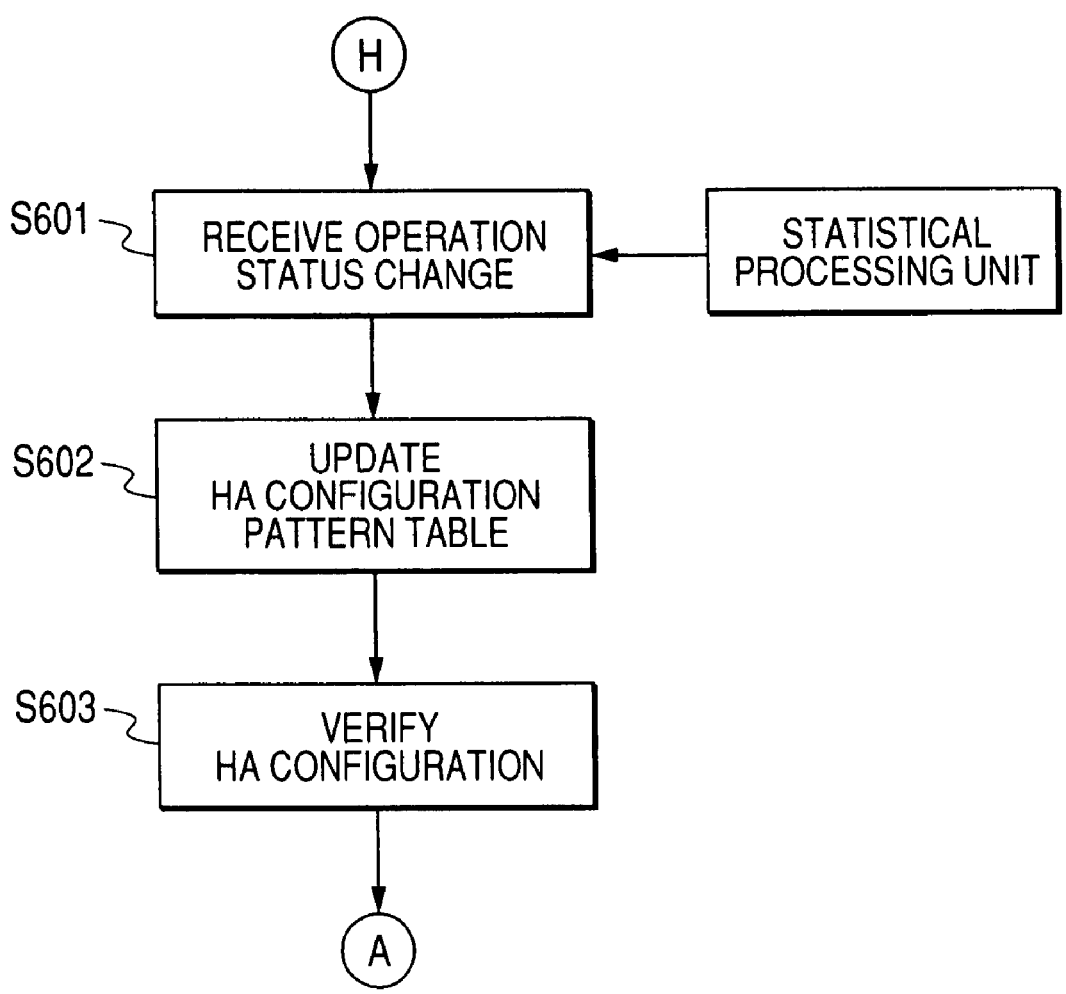

FIG. 27

| # | #1 | #2 | #3 | #4 | #5 |
|---|---|---|---|---|---|
| FAILURE RECOVERY METHOD | Reboot | Cold | Cold | Hot | Hot |
| FAILOVER DESTINATION SELECTION LOCATION — COMPUTER | COMPUTER A | COMPUTER A | COMPUTER B | COMPUTER A | COMPUTER B |
| FAILOVER DESTINATION SELECTION LOCATION — LPAR | IDENTICAL LPAR | DIFFERENT LPAR | DIFFERENT LPAR | DIFFERENT LPAR | DIFFERENT LPAR |
| RECOVERABLE FAILURE RANGE — AP | ○ | ○ | ○ | ○ | ○ |
| RECOVERABLE FAILURE RANGE — GUEST OS | ○ | ○ | ○ | ○ | ○ |
| RECOVERABLE FAILURE RANGE — HOST OS | × | × | ○ | × | ○ |
| RECOVERABLE FAILURE RANGE — COMPUTER | × | × | ○ | × | ○ |
| FAILOVER TIME (TOTAL) | 52.6 SEC | 95.4 SEC | 131.0 SEC | 10 SEC | 10.3 SEC |
| AP ESTIMATED PERFORMANCE (RESPONSE TIME) | 4.2 SEC | 3.9 SEC | 12.8 SEC | 4.3 SEC | 11.3 SEC |
| IO ESTIMATED PERFORMANCE (THROUGHPUT) | 4.1MB/sec | 4.5MB/sec | 7.3MB/sec | 3.7MB/sec | 7.1MB/sec |
| MAXIMUM CPU UTILIZATION RATIO | 40% | 23% | 50% | 18% | 50% |
| HA CONFIGURATION SELECTABLE | SELECTABLE | SELECTABLE | SELECTABLE | SELECTABLE | BEING SELECTED |

FIG. 28

| | | | |
|---|---|---|---|
| 1301 | AP IDENTIFIER | AP1 | AP2 |
| 1302 | LPAR IDENTIFIER | LPAR 1 | LPAR 2 |
| 1303 | AP HALT PERMISSIBLE TIME | 150 SEC | 110 SEC |
| 1304 | FAILOVER METHOD PRIORITY | NOT SPECIFIED | HOT STANDBY |
| 1306 | AP REQUIREMENT PERFORMANCE (RESPONSE TIME) | WITHIN RESPONSE 8 SEC | NOT SPECIFIED |
| 1307 | IO REQUIREMENT PERFORMANCE (THROUGHPUT) | NOT SPECIFIED | 4MB/sec |
| 1308 | CPU MINIMUM UTILIZATION RATIO | 20% | 20% |
| 1305 | AP PRIORITY | SECOND | FIRST |

FIG. 29

HA REQUIREMENT DEFINITION INPUT SCREEN (LPAR)

| | AP IDENTIFIER | AP1 ▼ ~2011 | | |
|---|---|---|---|---|
| | | HA REQUIREMENT TYPE 2012 | HA REQUIREMENTS 2013 | PRIORITY 2014 |
| CONDITION 1 | | AP HALT PERMISSIBLE TIME ▼ | 150 SEC ▼ | PRIORITY 1 ▼ |
| CONDITION 2 | | AP PERMISSIBLE RESPONSE TIME ▼ | 8 SEC ▼ | PRIORITY 2 ▼ |
| CONDITION 3 | | CPU MINIMUM UTILIZATION RATIO ▼ | 20% ▼ | PRIORITY 2 ▼ |

2001~

HA REQUIREMENT DEFINITION INPUT SCREEN (SYSTEM)

| | HA REQUIREMENT TYPE | HA REQUIREMENTS | PRIORITY |
|---|---|---|---|
| CONDITION 1 | AP PRIORITY ▼ | AP2, AP1 ▼ | PRIORITY A ▼ |

2101~

2201~ [CONDITION ADDED] [CONDITION DELETED]     [CANCEL] [RUN]

FIG. 30

| | | |
|---|---|---|
| 1601~ | POWER CONSUMPTION | MINIMIZATION |
| 1602~ | UPPER LIMIT OF LICENSE | AP1: MAXIMUM 2, AP2: MAXIMUM 4 |

FIG. 31

HA REQUIREMENT DEFINITION INPUT SCREEN (LPAR)

2001 — AP IDENTIFIER: AP2 ~2011

| | HA REQUIREMENT TYPE 2012 | HA REQUIREMENTS 2013 | PRIORITY 2014 |
|---|---|---|---|
| CONDITION 1 | FAILOVER METHOD SPECIFICATION | COLD STANDBY PRIORITY | PRIORITY 1 |

HA REQUIREMENT DEFINITION INPUT SCREEN (SYSTEM)

| | HA REQUIREMENT TYPE | HA REQUIREMENTS | PRIORITY |
|---|---|---|---|
| CONDITION 1 | POWER CONSUMPTION | MINIMIZATION | NOT SPECIFIED |
| CONDITION 2 | NUMBER OF LICENSES | AP1: MAXIMUM 2, AP2: MAXIMUM 4 | NOT SPECIFIED |

2101

2201 — [CONDITION ADDED] [CONDITION DELETED]   [CANCEL] [RUN]

FIG. 32

| | COMPUTER | PHYSICAL COMPUTER A | PHYSICAL COMPUTER B |
|---|---|---|---|
| 1401 | COMPUTER | PHYSICAL COMPUTER A | PHYSICAL COMPUTER B |
| 1402 | POWER CONSUMPTION | 200W | 180W |
| 1403 | CPU TYPE | CPU Type A (3.0GHz) | CPU Type B (2.4GHz) |
| 1404 | NIC TYPE | NIC Type A | NIC Type B |
| 1405 | HBA TYPE | HBA Type A | NIC Type B |
| 1406 | ALL PHYSICAL MEMORY CAPACITY | 3GB | 2GB |
| 1407 | HOUSING POWER | ON | ON |
| 1408 | EMPTY MEMORY CAPACITY | 2GB | 0GB |
| 1409 | AVAILABLE MEMORY CAPACITY | 1GB (LPAR1) | 2GB (LPAR3) |
| | | — | — |
| 1411 | LPAR | LPAR 1 | LPAR 3 |
| 1412 | RUN OS | GUEST OS 1 | GUEST OS 3 |
| 1413 | RUN AP | AP 1 | AP 1 |

FIG. 33

| | COMPUTER | PHYSICAL COMPUTER A | PHYSICAL COMPUTER B |
|---|---|---|---|
| 1401 | COMPUTER | PHYSICAL COMPUTER A | PHYSICAL COMPUTER B |
| 1402 | POWER CONSUMPTION | 200W | 180W |
| 1403 | CPU TYPE | CPU Type A (3.0GHz) | CPU Type B (2.4GHz) |
| 1404 | NIC TYPE | NIC Type A | NIC Type B |
| 1405 | HBA TYPE | HBA Type A | NIC Type B |
| 1406 | ALL PHYSICAL MEMORY CAPACITY | 3GB | 2GB |
| 1407 | HOUSING POWER | ON | OFF |
| 1408 | EMPTY MEMORY CAPACITY | 0GB | 2GB |
| 1409 | AVAILABLE MEMORY CAPACITY | 1GB (LPAR1) | — |
| | | 2GB (LPAR2) | — |
| 1411 | LPAR | LPAR 1 | LPAR 2 |
| 1412 | RUN OS | GUEST OS 1 | GUEST OS 2 |
| 1413 | RUN AP | AP 1 | AP 2 |

CLUSTER SYSTEM AND FAILOVER METHOD FOR CLUSTER SYSTEM

CROSS REFERENCE TO RELATED APPLICATION

This application is related to U.S. application Ser. No. 11/706876 filed on Feb. 20, 2007, the disclosure of which is hereby incorporated by reference.

CLAIM OF PRIORITY

The present application claims priority from Japanese application JP 2007-112056 filed on Apr. 20, 2007, the content of which is hereby incorporated by reference into this application.

FIELD OF THE INVENTION

The present invention relates to a computer system having high availability that takes a cluster configuration in a server virtualization environment, and more particularly to a method of performing failure monitoring and failover.

BACKGROUND OF THE INVENTION

The virtualization of a server computer (hereinafter referred to as server virtualization) is technology for allowing plural operating systems (hereinafter referred to as OS) to operate at the same time on a single physical computer. Logical partitioning, which is performed through a management program (server virtualization program) that splits resources of a physical computer into plural logical partitions (LPAR), is technology for allowing one OS (guest OS) to operate on each LPAR. The server virtualization program is a program that operates in a server virtualization layer (hereinafter referred to as a host OS), such as hypervisor and an OS different from the guest OS on the physical computer.

In the physical computer (server virtualization environment) that uses such logical partitioning, since any LPAR can be brought into use as an equivalent logical computer by the server virtualization program, the user can, on any LPAR, run a guest OS and applications on the guest OS. Thereby, the user can freely decide a position to execute a guest OS according to the load.

On the other hand, in the physical computer (server virtualization environment) that uses logical partitioning, since resources of the physical computer are shared by plural LPARs, a failure in resources of the physical computer could cause plural LPARs to fail.

Therefore, when a computer system having high availability is built in a server virtualization environment, a computer system is used which takes over (failover) an application program (hereinafter referred to as an application) having been operating on a guest OS to a guest OS of a different standby system when a failure occurs.

In "VMware (registered trademark) R Server Integrated Solution Using CLUSTERPRO (registered trademark)", [on-line], issued by NEC Corporation, retrieved on Oct. 31, 2006, Internet <URL:http://www.ace.comp.nec.co.jp/CLUSTER-PRO/clp/doc/pp_lin/CLUSTERPRO_VMware.pdf>, as cluster configuration methods in server virtualization environments, two methods are realized. As a first method, with a cluster program running on a guest OS on each LPAR, each cluster program on the guest OS monitors failures of the guest OS and AP on the other, and performs failover of AP. As a second method, with a cluster program running on a host OS, each cluster program on the host OS monitors failures of the host OS and the guest OSs on the other, and performs a failover of the guest OS.

With the first method, the cluster programs on the guest OSs monitor failures of the guest OSs and APs by communication (heartbeat) to perform failover to a standby system when a failure occurs in an active system in which the APs are operating. This failover method realizes hot standby that guest OSs and APs are previously activated in a standby system.

On the other hand, with the second method, the cluster program on the host OS monitors failures of the host OS and the guest OS by heartbeat so that, when a failure occurs in an active system, a standby system as a failover destination is booted by a guest OS on an identical computer or a different computer to perform failover. This failover method realizes cold standby that begins with the activation of a guest OS.

In U.S. Pat. No. 6,985,937, technology for dynamically guaranteeing the performance of applications on guest OSs in a server virtualization environment is described. According to the technology, the load on the guest OSs is monitored, and during overload, resources of a required guest OS are dynamically changed. Moreover, another technology is also described. According to the technology, during the resource change, when there are no allocatable resources in a physical computer in which a guest OS is run, by migrating the guest OS to a different physical computer having allocatable resources, resources of the guest OS are dynamically changed.

SUMMARY OF THE INVENTION

When the first and second methods described in U.S. Pat. No. 6,985,937 are combined, since the first and second methods perform failover independently, failover to different LPARs may be performed. As a result, LPARs of plural active systems may take over applications at the same time, and when such conflict of failover occurs, data may be destroyed by the plural active systems, and system halt may occur. This is a first problem.

Since cluster programs that perform failure monitoring and failover are different between the first and second methods, which method is to be user for failover must be previously decided. Therefore, for example, as described above, when applications are freely to be run in an arbitrary LPAR, since a failover method must be previously selected, the failover method cannot be changed. Therefore, when LPAR is added or deleted, or the configuration of a physical computer that provides server virtualization environment is changed, the lack of operation performance and excessive failover performance may be provided against high availability desired by the user. This is a second problem. Because of this problem, when failover performance is lacking, systemdown occurs at failure (after takeover completion), while when performance is excessive, extra system resources may be consumed.

On the other hand, when the methods described in the U.S. Pat. No. 6,985,937 are used in a system of cluster configuration, according to the load on a guest OS of an active system that is performing processing, the guest OS of the active system can be migrated to a physical computer having sufficient resources. However, even when an application of a guest OS of a standby system monitors load before failover, it cannot monitor load after the failover. Therefore, with the technology described in the U.S. Pat. No. 6,985,937, since guest OSs of standby systems are not changed, like the second problem, the lack of operation performance and excessive failover performance may be provided against high availability desired by the user.

Additionally, as described in the "VMware (registered trademark) R Server Integrated Solution Using CLUSTERPRO (registered trademark)", [online], issued by NEC Corporation, retrieved on Oct. 31, 2006, Internet <URL:http://www.ace.comp.nec.co.jp/CLUSTERPRO/clp/doc/pp_lin/CLUSTERPRO_VMware.pdf>, and the U.S. Pat. No. 6,985,937, when the migration of a guest OS extending beyond one physical computer is applied, since it is necessary to avoid duplicate migration of the guest OS, processing is required to halt the guest OS in a migration source and start it in a migration destination. Therefore, a guest OS to be migrated cannot form a cluster configuration when the guest OS is being migrated, that is, after the halt of the guest OS in the migration source until the start of the guest OS in the migration destination. As a result, like the second problem, failover performance may become lacking.

As has been described above, in a conventional server virtualization environment, since only fixed failover methods can be provided for guest OSs, for a physical or logical change of configuration, high availability desired by the user cannot be adequately satisfied, with the result that system-down occurs at failure, or excessive resource consumption occurs during normal operation.

The present invention has been made in view of the above problems, and its object is to realize freely changeable failover methods in a server virtualization environment to provide a cluster configuration suitable for high availability desired by the user in the event of a physical or logical change of configuration.

The present invention is a cluster system failover method that monitors at least one physical computer including a virtualization unit that provides plural systems that execute application programs on guest OSs, and the guest OSs or applications of the systems to switch the systems to a different system when a failure occurs in the guest OSs or application programs. The cluster system failover method includes the steps of: for each of the systems, setting a switchable different system at failure, and any one of plural preset failover methods as a failover candidate in a high availability configuration pattern; for each of the systems, setting failover requirements required at failure as high availability requirements; selecting one of failover methods set in the high availability configuration pattern that meets the high availability requirements; and when a failover method meeting the high availability requirements exists, setting the failover method selected from the high availability configuration pattern as realizable, and a different system meeting the high availability requirements as a failover destination of a system concerned.

The present invention is also a cluster system that includes: a virtualization unit that operates plural guest OSs on a physical computer; plural systems comprising application programs that operate on the each guest OS; and a cluster management unit that monitors the application programs or the guest OSs to switch the application programs to a different system at failure. The cluster system includes: a high availability requirement setting unit that sets failover requirements set for each of the systems and required at failure as high availability requirements; a high availability configuration pattern setting unit that, for each of the systems, sets a switchable different system at failure, and any one of plural preset failover methods as a failover candidate in a high availability configuration pattern; and a high availability configuration determining unit that selects a failover method meeting the high availability requirements, of failover candidates set in the high availability configuration patterns, and a different system meeting the high availability requirements as a failover destination of a system concerned. The cluster management unit performs the failover, based on a failover method and a failover destination selected by the high availability configuration determining unit.

Therefore, the present invention can provide a function to realize a cluster configuration suitable for HA requirements desired by the user by operating a cluster management unit (slave cluster program and master cluster program) that provides plural failover methods for guest OSs/host OSs (virtualization unit) in a cluster configuration in a server virtualization environment to select and realize a failover method meeting specified high availability requirements (HA requirements).

Thereby, in a cluster configuration that provides plural failover methods for guest OSs in a server virtualization environment, in the event of change of physical or logical configuration of a system, and operation status, by selecting a failover method suitable for desired high availability requirements, a cluster configuration having neither too excessive nor too lacking computer resources can be provided for desired high availability requirements.

BRIEF DESCRIPTION OF THE DRAWINGS

FIG. 6 also shows a first embodiment and illustrates a configuration of a failover correspondence table;

FIG. 7 also shows a first embodiment and illustrates a configuration of an HA configuration pattern;

FIG. 8 also shows a first embodiment and illustrates HA requirement definition;

FIG. 9 also shows a first embodiment and illustrates HA requirement definition;

FIG. 17 also shows a second embodiment and illustrates a standby setting definition 612;

FIG. 20 also shows a third embodiment and illustrates configuration information 632;

FIG. 21 also shows a third embodiment and is a flowchart showing an example of verification processing of HA configuration performed by an HA configuration determining unit of a master cluster program;

FIG. 22 also shows a third embodiment and is a screen image showing an example of a user interface;

FIG. 23 also shows a third embodiment and is a screen image showing another example of a user interface;

FIG. 25 shows a fourth embodiment and illustrates an operation history 642;

FIG. 26 also shows a fourth embodiment and is a flowchart showing verification processing of HA configuration performed by an HA configuration determining unit 527 of a master cluster program;

FIG. 27 also shows a fourth embodiment and illustrates an HA configuration pattern table 528;

FIG. 28 also shows a fourth embodiment and illustrates an HA requirement definition 124;

FIG. 29 also shows a fourth embodiment and illustrates a user interface;

FIG. 30 shows a fifth embodiment and illustrates HA requirement definition indicating HA requirement in terms of operation costs of the entire system that a slave cluster program 120 can set;

FIG. 31 also shows a fifth embodiment and is a screen image showing an example of a user interface;

FIG. 32 also shows a fifth embodiment and illustrates configuration information 632 managed by a configuration management unit 631; and FIG. 33 also shows a fifth embodiment and illustrates configuration information 632 managed by a configuration management unit 631 after HA configuration is changed.

DETAILED DESCRIPTION OF THE PREFERRED EMBODIMENTS

Figure 1:
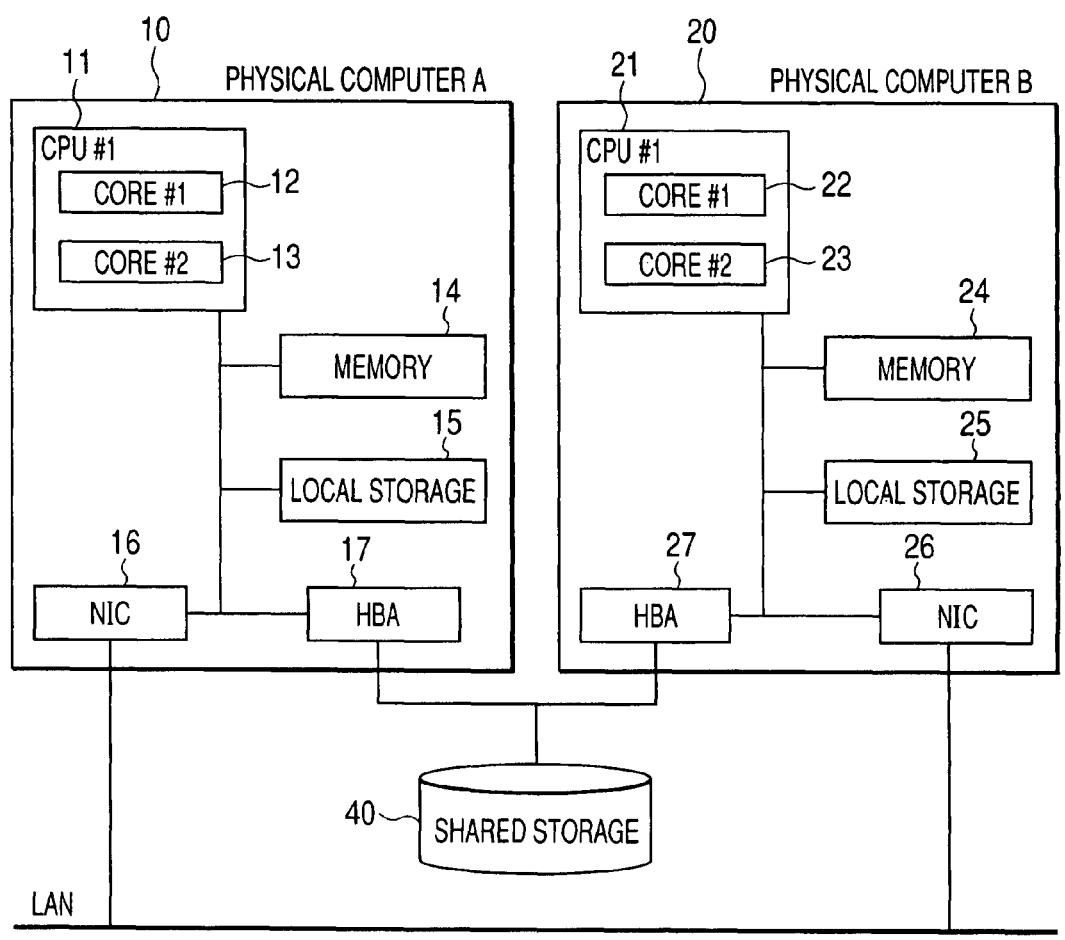
FIG. 1 is a block diagram showing the hardware configuration of a physical computer of server virtualization environment of a first embodiment.

Hereinafter, embodiments of the present invention will be described with reference to the accompanying drawings.

First Embodiment

It should be understood that drawings and descriptions relating to the present invention are simplified to show elements suitable to clearly understand the present invention, and existing elements are omitted in such a range as not to obstruct implementation of the present. Other some conventional elements considered desirable and/or necessary to implement the present invention exist in this technology. However, these elements are known and useless to understand the present invention. Therefore, they are not described here.

In descriptions below, there are cases where each program is described using a module number in an active system (or current system), but there are cases where its description is also used as the description of a corresponding program in a standby system. Furthermore, some reference numerals in drawings that follow are the same as those in other drawings; descriptions of them are the same as those of other drawings unless otherwise noted.

FIGS. 1 to 13 relate to a first embodiment of the present invention.

FIG. 1 is a block diagram showing the hardware configuration of a physical computer of a server virtualization environment of the first embodiment.

The physical computer A of the first embodiment includes CPU 11, memory 14, storage device 15, NIC (Network Interface Card) 16, HBA (Host Bus Adaptor) 17, sharing storage 40 connectable via the HBA 17.

The CPU 11 executes a program stored in the memory 14 to perform various types of processing. The memory 14, storage device 15, and sharing storage device 40 store programs executed by the CPU 11, and data necessary for processing. The NIC 16 communicates with other computers (e.g., physical computer B) via a network (LAN in the drawing). The CPU 11 includes plural cores #1 and #2 to perform plural processes (e.g., plural OSs) in parallel.

A physical computer B, which is also configured like the physical computer A, includes CPU 21, memory 24, storage device 25, NIC 26, and HBA 17. The CPU 21 executes programs stored in the memory 24, the storage device 25, and the sharing storage device 40 to perform various processes. The CPU 21 also includes plural cores #1 and #2 to perform plural processes in parallel.

In this embodiment, the physical computer A constitutes a computer system of an active system (first system), and the physics computer B constitutes a computer system of a standby system (second system).

Figure 2:
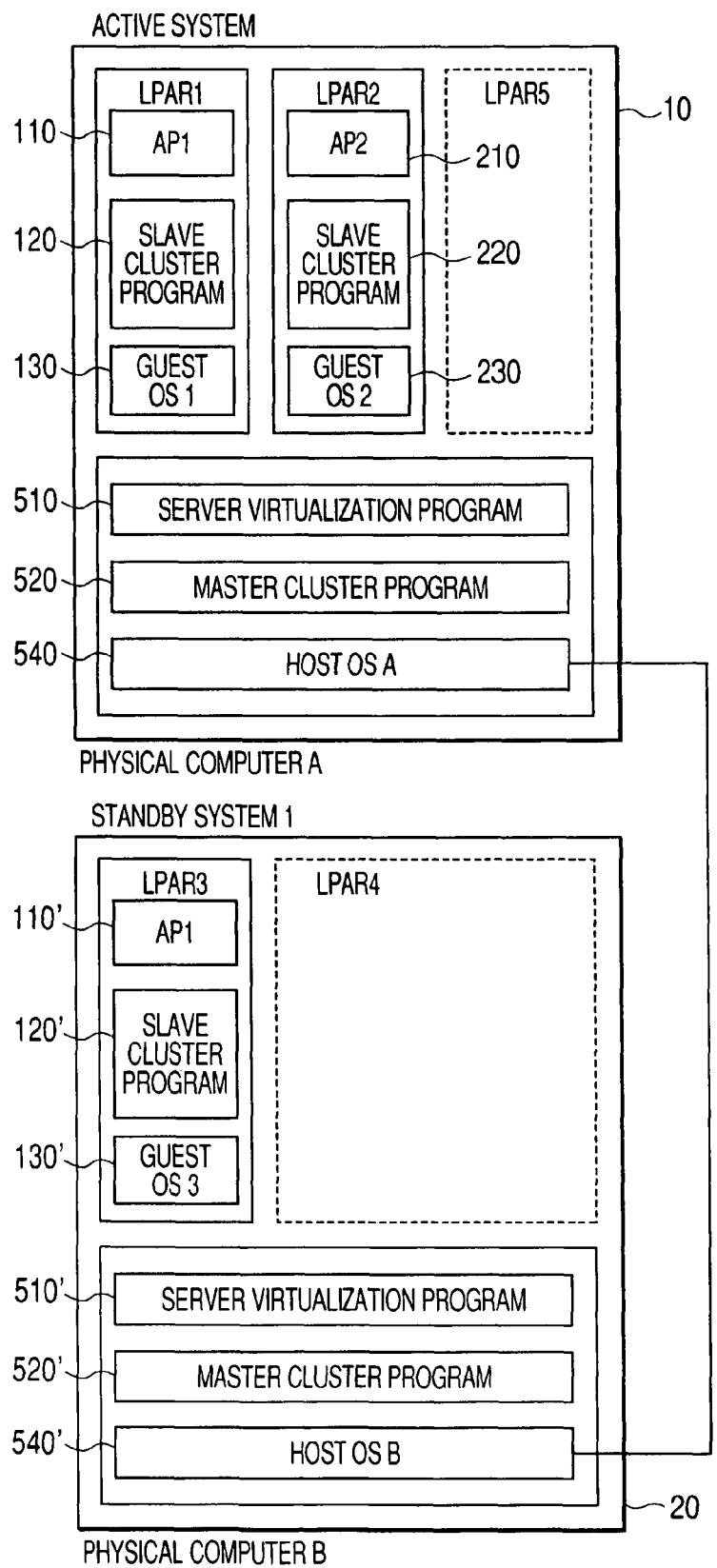
FIG. 2 also shows a first embodiment and is a functional block diagram centering around software of a server virtualization environment in a physical computer.

FIG. 2 is a functional block diagram centering around software of a server virtualization environment in the physical computer shown in FIG. 1.

In the physical computer A constituting the active system, a server virtualization program 510 constituting logical partitions (hereinafter referred to as LPAR=Logical PARtition) operates on a host OS_A (540), providing LPAR 1 and LPAR 2. The server virtualization program 510 provides new LPAR 5 different from the LPAR 1 and LPAR 2. The host OS 540 and the server virtualization program 510 constitute a virtualization part.

In LPAR1, a guest OS1 (130) is executed, an application program (AP1) 110 operates on the guest OS 1, and a slave cluster program 120 operates which monitors an application program AP1 (hereinafter referred to as an application), and has a function to report operation states of the application AP1 to a master cluster program 520, and a function to perform failover between the active system and the standby system upon reception of a command from the cluster program 520.

In PAR2, a guest OS2 (230) is executed, an application program (AP2) 210 operate on the guest OS 2, and a slave cluster program 220 operates which monitors an application program AP2. In LPAR5, neither guest OS nor applications operate, and when any LPAR on the active system or standby system is switched, the guest OS, application, and slave cluster program on the switched LPAR operate on the LPAR5. The LPAR5 may be LPAR set previously, or new LPAR offered by the server virtualization program when the switching is performed.

In the host OS_A, the master cluster program 520 operates which monitors the applications or the guest OSs of the LPAR1 and LPAR2, or other virtualization parts, and has a function to command the slave cluster program to perform first failover between the LPAR1 and LPAR3 when a failure occurs in the active system LPAR1 having the standby system LPAR2. Additionally, the master cluster program 520 has a function to perform second failover by switching the guest OS and application between the LPAR2 and the new LPAR5 and activating the LPAR5, guest OS, and application when a failure occurs in the active system PLAR2 having no standby system.

On the other hand, also in the physical computer B constituting a standby system, software of the same configuration as the active system is executed. Specifically, in the physical computer B, a server virtualization program 510' constituting LPAR3 operates on a host OS_B (540'). The server virtualization program 510' provides new LPAR4 different from the LPAR3. In the LPAR3, a guest OS3 (130') is executed, in the guest OS 3, an application (AP1) 110' for switching from the active system operates, and a slave cluster program 120' operates which monitors application AP1 of the active system, has a function to report monitoring results to the master program 520', and a function to perform first failover between the active system and the standby system upon reception of a command from the master cluster program 520'.

In the standby LPAR4, neither guest OS nor application operates. When any LPAR on the active system or the standby system is switched, guest OS, applications, and slave cluster program on the switched LPAR operate.

In the host OS_B, the master cluster program 520' operates which monitors the application or the guest OS of the LPAR3, or other virtualization parts, and has a function to command the slave cluster program to perform first failover between the LPAR1 of the active system and the LPAR3 of the standby system when a failure occurs in the active system LPAR1 having the standby system LPAR2. Additionally, the master cluster program 520' has a function to switch the guest OS and the application between the LPAR2 and the new LPAR4 and perform second failover by activating the LPAR4, the guest OS, and the application when a failure occurs in the LPAR2 of the active system having no standby system.

The switching of the guest OS and the application performed by the master program 520' of the standby system may be achieved by new LPAR's using a disk device from which the guest OS and the application are activated, or by using snapshot during operation of the guest OS and the application. The LPAR4 and LPAR5 constitute a third system as a cold standby.

Figure 3:
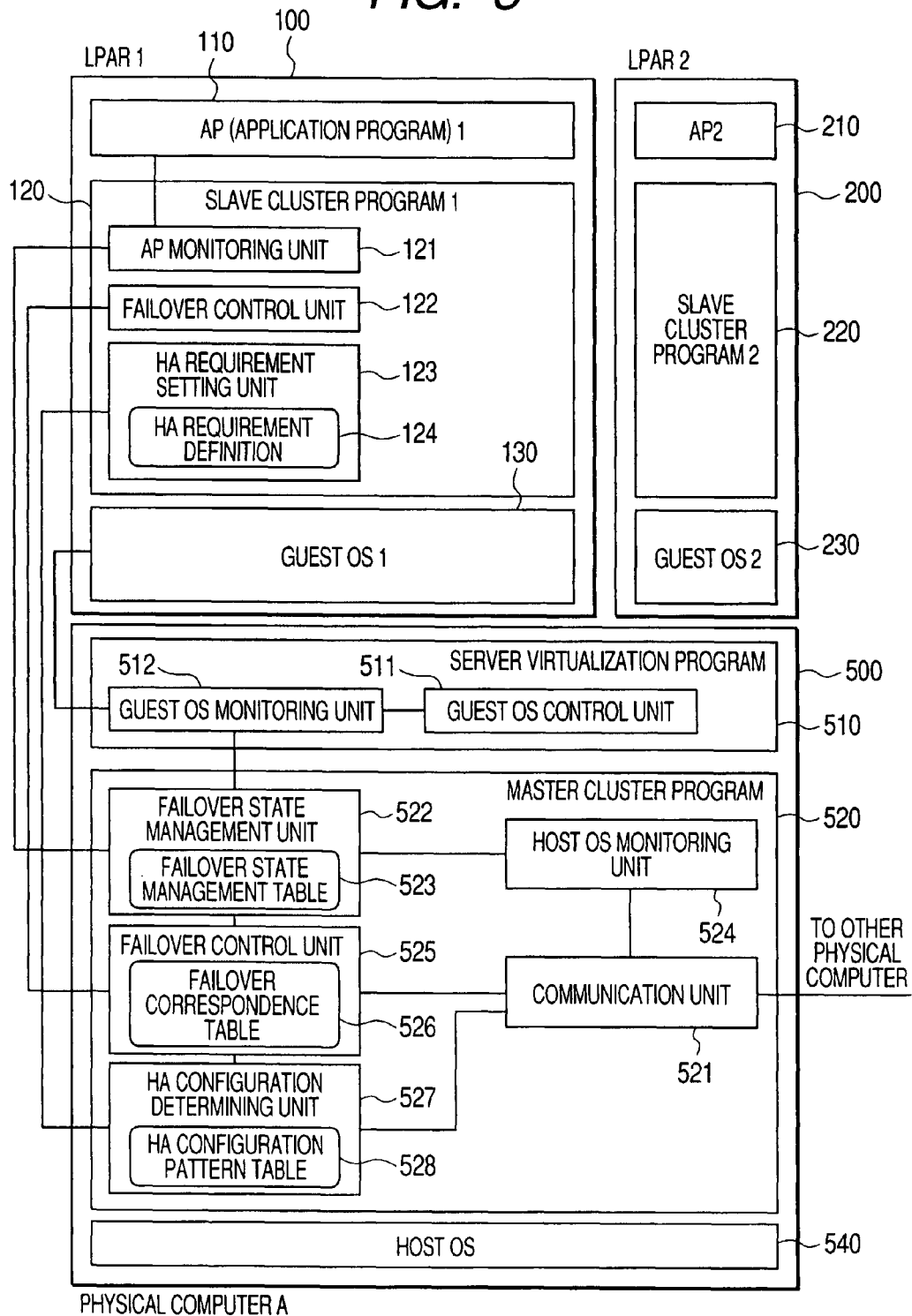
FIG. 3 also shows a first embodiment and is a block diagram showing a detailed configuration of software performed by a physical computer A.

FIG. 3 is a block diagram showing a detailed configuration of software performed by the physical computer A of the active system. Since the plural physical computers A and B have the same configuration as described above, in FIG. 3, only the software configuration of the physical computer A is described, and the description of the software configuration of the physical computer B is omitted. Since the plural LPARs of the physical computer A also have the same configuration, only the LPAR1 is described and detailed descriptions of another LPAR2 are omitted.

The physical computer A includes a logical host node 500 in which a server virtualization program 510 that manages LPAR1 and LPAR2 operates, and LPAR groups 100 (LPAR1) and 200 (LPAR2) managed by the server virtualization program 510.

The LPAR 100 includes a guest OS 130 that operates as an OS, an application (AP1) 110 that performs operations on the guest OS 130, and a slave cluster program 120 that has a function to set high availability requirements (hereinafter referred to HA requirements) to define high availability required by the application AP1 in a master cluster program 520 and report the HA requirements to the master program 520, a function to monitor states of the application (AP1) 110, and report the states to the master program 520, and a function to perform first failover between the active system and the standby system upon reception of a command from the master cluster program 520. The HA requirements are requirements for deciding a mode of failover (failover method and failover destination) performed when a failure occurs in the application 110 and the guest OS 130.

The slave cluster program 120 includes an application monitoring unit 121 that monitors states of the application 110 and reports the states to the master cluster program 520, and a failover control unit 122 that performs failover of the application according to a command from the master cluster program 520. Moreover, the slave cluster program 120 includes an HA requirement setting unit 123 that sets HA requirements that define high availability required by the application 110, and reports the HA requirement to the master cluster program 520.

The HA requirement definition unit 123 has, for example, HA requirement definitions 124 as shown in FIG. 9. The HA requirement includes specification of time (application stop permissible time) permitted until completion of application takeover because of failover when a failure occurs. When plural failure recovery methods including failover are available, the failure recovery methods may be specified as the HA requirement. When failover of plural applications occurs, priority of the application may be specified as the HA requirement.

Furthermore, the HA requirement may include requirements on application performance for assuring that the application operates stably after failover. For example, a logical computer as a failover destination, or a range of a physical computer may be specified. As a method of specifying the range, besides directly specifying the position and range of the computer, for example, of functions of computer resources such as CPU, memory, storage device, NIC, and HBA owned by the logical computer or physical computer, functions used by the application may be specified. Or types of computer resource (e.g., individual product names of CPU and storage device) may be specified. Furthermore, the upper limit of licenses may be specified to decide the number of concurrent executions of applications.

The HA requirement definition 124 shown in FIG. 9 includes identifiers 1301 and 1302 respectively indicating target applications and LPAR, stop time 1303 permissible to AP indicated by the LPAR identifier 1302, and preferential failover method 1304. When priority is specified in each requirement definition, for each of the identifiers 1301 and 1302, the requirement definition includes information indicating its priority. Additionally, it includes application priority specification 1305 to specify the priority of plural applications. The priority specification 1305 is HA requirement for the entire system that influences plural applications. When such HA requirements on the entire system are plural, priorities different from the HA requirement definitions 1301 to 1304 inside the application can be afforded, and the priorities are included in the priority specification 1305.

The HA requirement definition of FIG. 9 may be specified using a user interface (UI) as shown in FIG. 8. For example, UI of FIG. 8 includes UI 2001 that defines HA requirements for the application identifiers and the applications of the setting items of the HA requirement definition 124, UI 2101 that defines HA requirement for the entire system for plural applications, UI 2201 that adds or deletes the HA requirements, and reports definitions to the master cluster program 520 and cancels definitions, UI 2301 that displays execution results in the UI 2201, and UI 2401 that approves or changes HA configuration as a result of the 2301. The UIs may be displayed at the same time, or only part of it may be displayed. For example, if applications are limited to one type, the UI 2101 that specifies HA requirements for the entire system may be omitted, and the UIs 2301 and 2401 concerning the execution result may be displayed independently of other UIs. The UI 2001 includes UI 2011 that specifies an AP identifier, and UIs 2012, 2013, and 2014 that specifies an identifier of HA requirements, specification contents, and priority. Each UI may be specified by a method of selecting from specifiable candidates, or users may enter arbitrary information.

Priority uniquely determined in each HA requirements specified in the UI 2001 is specified in the UI 2104. Additionally, an execution result displayed in the UI 2301 may indicate not only information of a failover method set by the master task program but also information indicating that any failover method could not be set. When setting is impossible, the UI 2401 may be used to modify the HA requirements for re-input. Although a graphical UI is shown as an example of UI in FIG. 8, the UI may be provided as an I/F with commands and programs combined. The user interface can be supplied by a manager with results of execution by consoles connected to the physical computers A and B, and computers connected to a network.

Figures 4, 5:
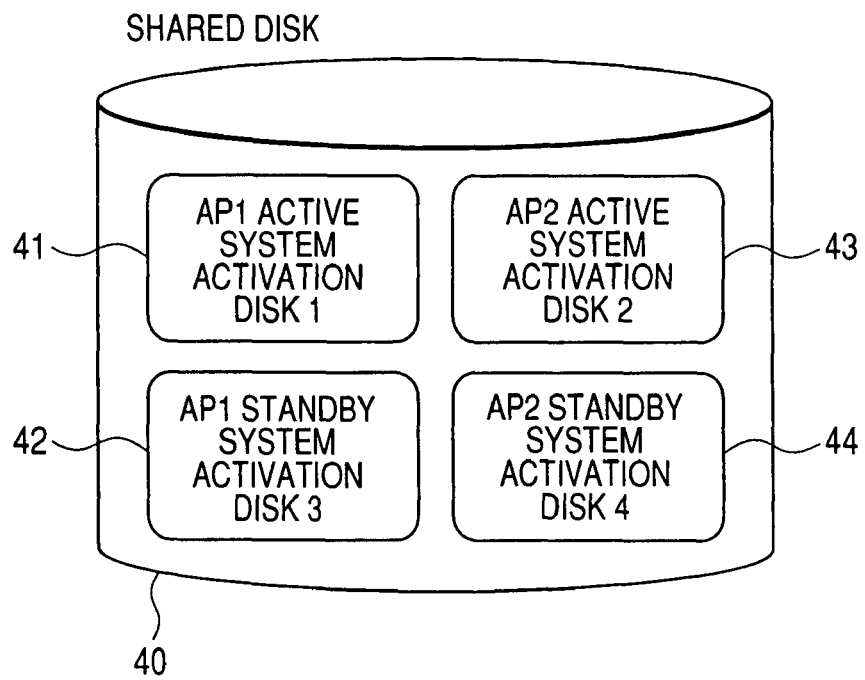
FIG. 4 also shows a first embodiment and is a block diagram showing applications stored in a shared storage device and activation disks corresponding to individual systems.
FIG. 5 also shows a first embodiment and illustrates a configuration of a failover state management table.

The UI 2001 shown in FIG. 8 shows an example of the setting of the application AP1 stored in the sharing storage device 40 shown in FIG. 4. AP halt permissible time is 150 seconds, and a first failover (hot standby) method is requested. The UI 2101 indicates for which of the applications AP1 and AP2 of FIG. 4 a failover method is decided preferentially, and indicates that the application AP2 precedes AP1. The UI 2301 indicates that as execution results, as shown in FIG. 4, a first failover method with LPAR1 and LPAR3 used as an active system and a standby system, respectively is applied.

As operation states of the application 110, in addition to signals generated during execution of the application 110, data and files generated by the application 110 can be included. These pieces of information constitute operation status indicating operation states of the application 110. These operation states can be detected by detecting operation states of the application 110.

In FIG. 3, in the host node 500, the host OS 540 (OS_A) operates. The host node 500 includes a server virtualization program 510 that manages the LPAR1 and LPAR2, and the master cluster program 520 on the host OS 540.

The server virtualization program 510 includes a guest OS control part 511 that allocates physical computer resources (hardware) shown in FIG to the guest OS 130, and a guest OS monitoring unit 512 that manages operation states of the guest OS obtained the guest OS 130. The guest OS monitoring unit 512 reports monitoring results of the guest OS 130 to a failover state management unit 522 owned by the master cluster program 520.

Furthermore, the master cluster program 520 of the active system includes a communication unit 521 that can perform communications with the other physical computers B and the slave cluster programs 120 and 220 on the host OS 540, a host OS monitoring unit 524 that monitors operation states of the host OS 540, and a failover state management table 523 that records operation states of applications, guests OS, the host OS 540, and a failover state management unit 522 that monitors states of systems. Additionally, the cluster program 520 includes a failover control unit 525 that includes a failover correspondence table 526 that records a failover method executed when the host OS monitoring unit 524 detects a failure, and according to the failover correspondence table 526, performs the first failover method by issuing a failover command to the slave cluster programs 120 and 220 serving as failover destinations when a failure occurs, or performs failover by the second failover method for the LPAR4 and LPAR5 serving as the third system.

Additionally, the master cluster program 520 includes an HA configuration determining unit 527 that includes an HA configuration pattern table 528 showing whether each guest OS can perform the first failover method and the second failover method, selects a failover method meeting the HA requirement definition 124 defined in the HA requirement setting unit 123 of the slave cluster program 120 from the HA configuration pattern table (high availability configuration pattern information) 528, and sets it in the failover control unit 525.

The HA configuration pattern table 528, as shown in FIG. 7 described later, contains patterns of HA configurations applied to applications. For example, the HA configuration pattern table 528, when plural failure recovery methods (failover methods) exist, may contain specifications of failover methods, or when plural failover destinations exist, may contain specifications of the failover destinations. Furthermore, the pattern table may contain the range of failure recovery depending on a specified failover method and a failover destination, as information. According to types of the HA requirements described previously, the pattern table may contain performance values on the HA requirements, and information indicating the legality of provision for the HA requirements. For example, in FIG. 7, correspondingly to the HA requirement of the application stop permissible time, failover time is included, or selection OK/NG information indicating whether setting is possible is included in applications for which HA configuration patterns are targeted.

The master cluster program 520 performs monitoring by heartbeat with the other master cluster program 520' such as a standby system through the communication unit 521, thereby monitoring failures in other host OSs and guest OSs.

The failover state management table 523 shown in FIG. 5 includes applications 110 and 210 managed by the server virtualization program 510, guest OSs 130 and 230, identifiers 1001 of host OS 540, applications having the identifiers, guest OSs, and states 1002 of the guest OSs. FIG. 5 shows that individual applications, guest OSs, and host OSs are normal (Status OK).

FIG. 6 is an explanatory drawing showing an example of the failover correspondence table 526 managed by a failover control unit 525 of the master cluster program 520.

The failover correspondence table shown in FIG. 6 stores failover methods applied to applications 1111 and 1112 indicated by the application identifiers 1101. For example, in FIG. 6, the table has types of failover method 1102 and failover states 1103 representative of active system (ONL) and standby system (SBY) in each failover method, and for each of the failover states, has Identifiers 1104, 1105, 1106, 1107, and 1108 representative of physical computer, LPAR, host OS, guest OS, and activation disk respectively that are located in the system. In FIG. 6, as shown in FIG. 3, the application AP1, which is in a first failover state (Hot Standby), and sets an active system to LPAR1 and a standby system to LPAR3, and the application AP2 is in a second failover state (Cold Standby); an active system is set to LPAR2, and a standby system is set to the physical computer B.

The activation disk 1108 refers to applications on the sharing storage device 40 shown in FIG. 4, and activation disks corresponding to individual failover states. FIG. 4 shows that activation disks 41 and 42, and 43 and 44 exist as activation disks of active system and standby system of applications AP1 and AP2, respectively.

The HA configuration pattern table 528 shown in FIG. 7 has an identifier 1201 representative of an application. The HA configuration pattern table 528 additionally has identifiers 1211, 1212, 1213, 1214, and 1215 representative of realizable failover methods, identifier 1202 of failover (failure recovery) method realized for each of the identifiers 1211 to 1215 of the failover methods, identifier 1203 of failover destination, identifier 1204 of failure type recoverable by failover, and time 1205 required for failover.

For example, the identifier 1202 covers the first failover method (Hot=hot standby in the drawing) and the second failover method (Cold=cold standby in the drawing), and by the identifier 1203, in the first failover method (Hot), classification is made by on which physical computer a standby system serving as LPAR different from an active system is realized. Likewise, in the second failover method, by the identifier 1203, when identical LPARs of active systems are different, like the first failover method, classification is made by on which physical computer a standby system (failover destination) is realized. The identifier 1204 contains failure locations corresponding to states monitored by the failover state management unit 522. In the identifier 1204 of a recoverable failure range shown in FIG. 7, an example of not regarding lost heartbeat between host OSS as a computer failure is shown, and failures occurring in the other physical computer B are included in the recoverable failure range.

Furthermore, the failover time 1205 indicates time (failover time) in which an application AP is halted by a failover method, and in this embodiment, is defined by users' performing setting from the above-described console or the like. Additionally, although HA requirement definitions corresponding to the identifier 1204 of the recoverable failure range are not shown in the HA requirement definitions and UI specified in FIGS. 8 and 9, the identifier 1204 of the recoverable failure range may be defined in corresponding HA requirements in FIGS. 8 and 9.

Furthermore, the HA configuration pattern table 528 has an identifier 1206 indicating whether failover methods set in the identifiers 1211 to 1215 are selectable. The identifier 1206 indicates whether the failover methods set in the identifiers 1211 to 1215 are selectable, or currently selected. For example, FIG. 7 shows that, for the application AP1, the first failover method (#5) having a standby system (LPAR3) in a computer (physical computer B) different from LPAR1 (physical computer A) is selected.

FIGS. 10 to 13 are flowcharts representative of the operation of the first embodiment.

Hereinafter, individual operations shown in the flowcharts include operations combined with modules other than each cluster program.

Figure 10:
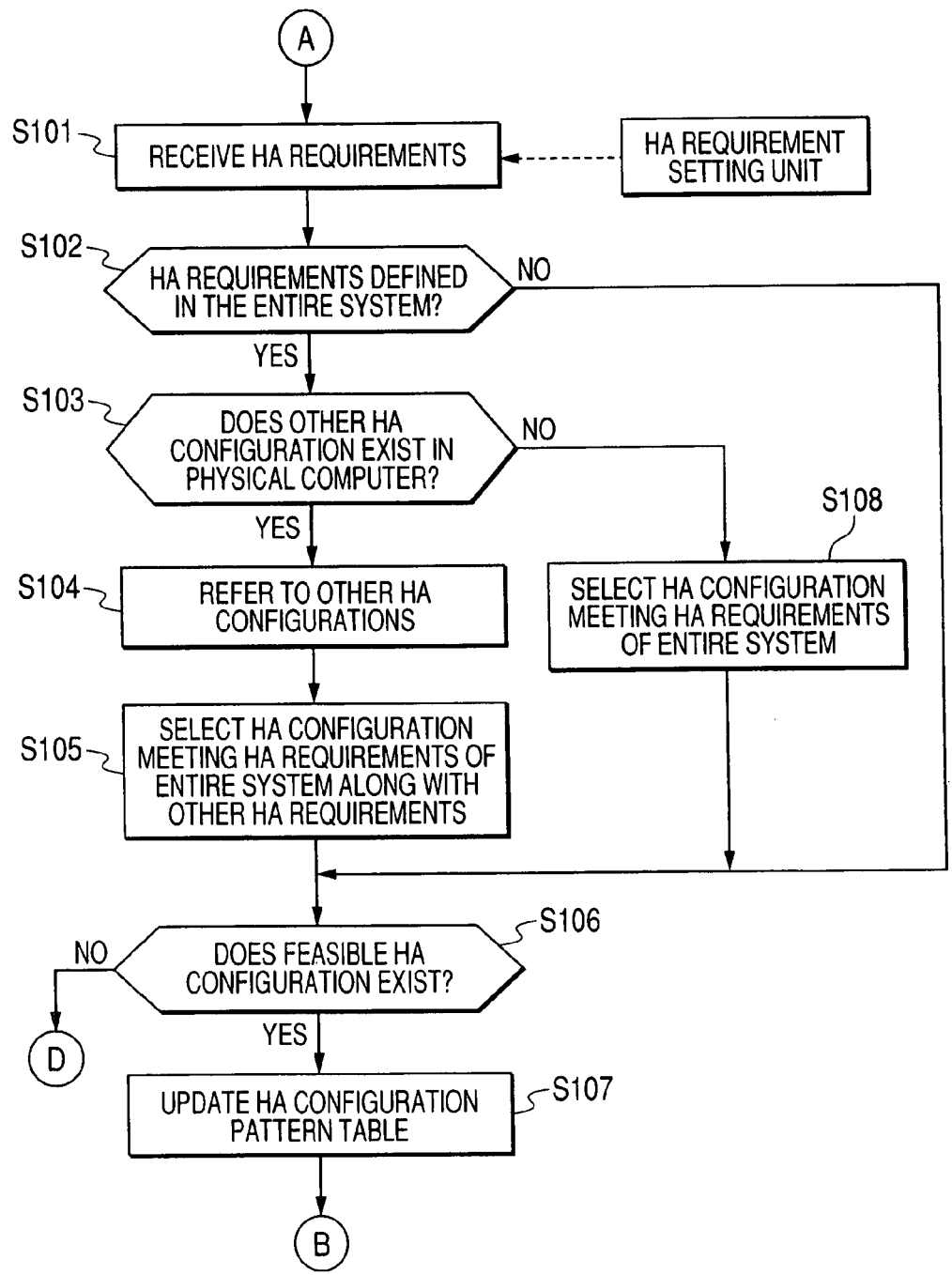
FIG. 10 also shows a first embodiment and is a flowchart showing updating of HA requirement definition performed by a master cluster program of an active system (first processing)

FIG. 10 is a flowchart showing an example of first processing performed when HA requirement definitions on the entire system exists in the case where the HA configuration determining unit 527 of the master cluster program 520 of active system is notified of HA requirement definitions 124 defined in the HA requirement setting unit 123 of the slave cluster program 120 of active system. Although processing on an active system is described below, the same is also true for the other guest OS2 and processing of standby system.

On receiving HA requirement definitions from the HA requirement setting unit 123 on the guest OS 130 of the active system (S101), the HA configuration determining unit 527 determines whether HA requirements for the entire system specified in the UI 2101 are specified (S102). If the HA requirements for the entire system are not defined, since no constraints occur in realizable HA configuration, it determines whether realizable HA configuration exists (S106).

On the other hand, if the HA requirements are defined, it determines whether HA configuration by other applications exists (S103). When it does not exist, the HA requirements need only to be applied to the own application, and the HA configuration determining unit 527 selects HA configuration meeting the HA requirements in S108, and then executes S106.

On the other hand, when another application exists in S103, it refers to the HA configuration of the application (S104), and selects HA configuration meeting the HA requirements together with the HA configuration (S105). For example, as shown in the UI 2101 of FIG. 8, when priority is specified in the order of applications AP1 and AP2, if it the HA configuration of the application AP2 is already decided, the setting of the application AP1 is executed in S104 and S105 to select HA configuration not conflicting with the HA configuration of the application AP2 having higher priority than it.

On the other hand, if the HA configuration of the application AP2 is undecided, the HA configuration determining unit 527 selects the HA configuration of the application AP1, and executes S106. Conversely, when the AP1 is set to have higher priority than the AP2, and the application AP1 has been already set, since the HA configuration of the AP2 takes precedence over that of the application AP1, it selects the HA configuration of application AP2 in S107, regardless of the application AP1. The selection of the HA configuration in S107 is realizable by performing the selection processing of the HA configuration performed in S201 to S215 in FIG. 11 described later, and when the HA configuration is selected, control is returned to the processing S104 from S215 to continue subsequent processing. When the HA configuration cannot be realized in the processes S201 to S215, error notification processing is realized by calling error notification processing D described later. The processing S106 determines whether a realizable HA configuration is selected. If realizable HA configurations exist in S106, the HA configuration determining unit 527 registers a candidate of the HA configurations in the HA configuration pattern table 528 as selectable (S107), and then performs selection processing B of the HA configuration by the HA requirements for the application. On the other hand, when no realizable HA configuration exists in S106, since an HA configuration cannot be realized, processing D is performed to report an error to the user.

Figure 11:
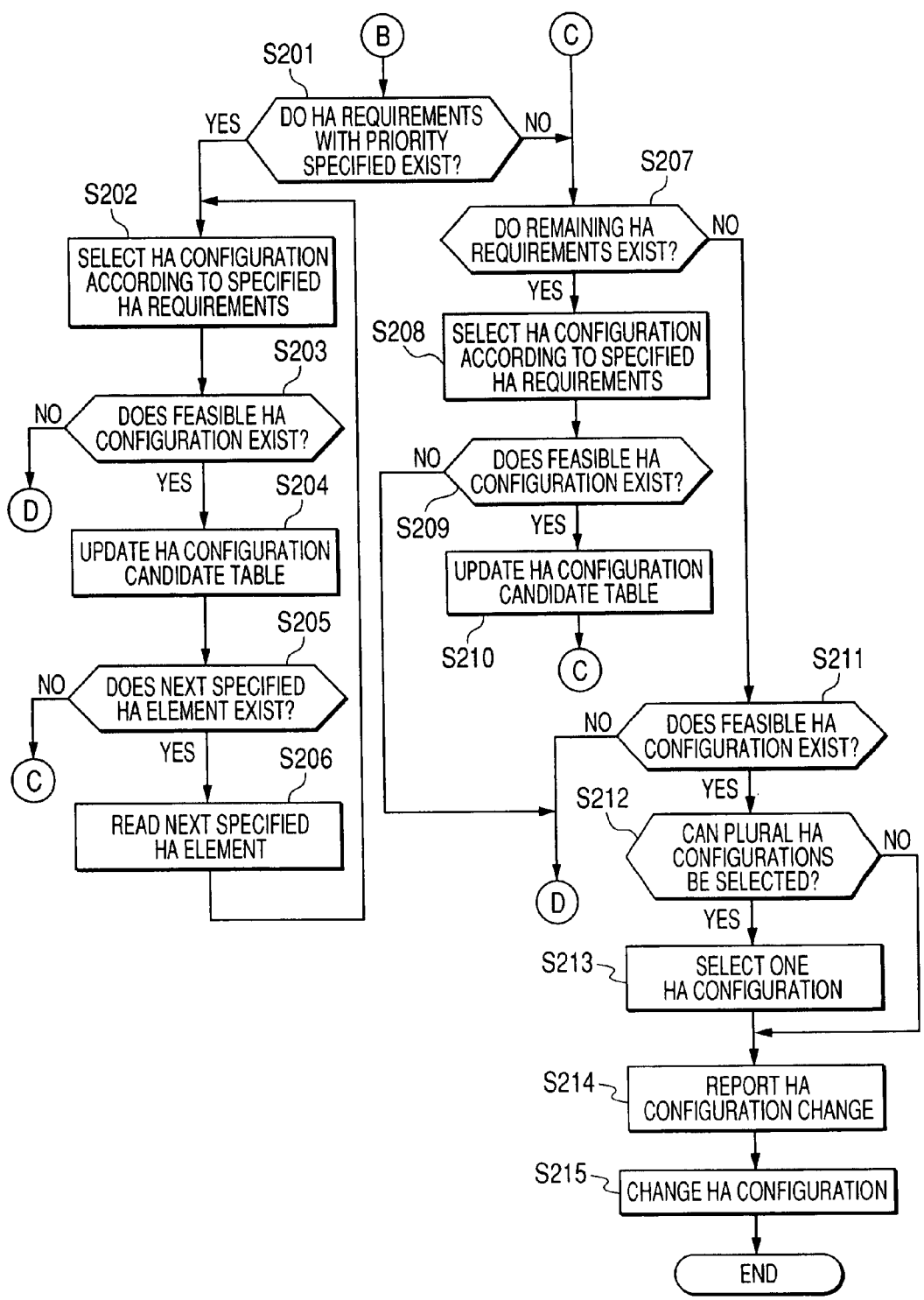
FIG. 11 also shows a first embodiment and is a flowchart showing updating processing of HA requirement definition performed by a master cluster program of an active system (second processing)

FIG. 11 is a flowchart showing an example of second processing performed by the HA configuration determining unit 527 when HA requirement definitions related to the application AP of the HA requirement definitions exist.

When called from the processing S107, the HA configuration determining unit 527 executes S201. S201 determines whether HA requirements with priority set in the HA requirements exist, and when they exist, performs S202 and following processes to perform processing for the specified HA requirements. S202 selects an HA configuration pattern according to HA requirements with priority specified. For example, in FIG. 9, since AP halt permissible time 1304 is defined with priority 1, an HA configuration pattern having failover time meeting the permissible time 1304 is selected. After selecting the HA configuration pattern, the HA configuration determining unit 527 determines whether a realizable HA configuration exists, like the above processing S106 (S203), and when it does not exist, performs processing D to report an error to the user.

On the other hand, when a selectable HA configuration exists in S203, like the processing S107, it selects a realizable HA configuration (S204), and determines whether the next HA requirement with priority given exists (S205). When the next HA requirement exists, it again returns to S202 after reading the HA requirements (S206), and select HA configuration, using the next HA requirements.

On the other hand, when HA requirements with priority specified have been already processed or do not exist in the S201, it performs application processing of remaining HA requirements with priority not specified in S208 and subsequent steps.

In S208, the HA configuration determining unit 527 determines whether HA requirements exist. When realizable HA requirements exist, it selects an HA configuration according to the specified HA requirements (S209). After selecting the HA configuration, it performs the same processes S209 and S210 as the S203 and S204. That is, when no realizable HA configuration exists, it performs processing D to report an error to the user, when existing, it returns to processing S208 to select an HA configuration by the next HA element. On the other hand, when there have been no specified HA requirements in S208, it means that all HA requirements have been applied, and the HA configuration determining unit 527 determines whether a realizable HA configuration exists (S211). When no realizable HA configuration exists in S211, it performs processing D to report an error to the user. On the other hand, when a realizable HA configuration exists, it determines whether plural HA configurations are selectable (S212). When plural HA configurations exist, since any of them can be selected, it selects one of them as described later (S213). As a selection method, an index other than HA elements may be used for selection, or plural candidates may be again presented to the user via the HA requirement setting unit 123 of the slave cluster program 120 to allow the user to explicitly select from among them. In S214, since one HA configuration has been decided, it reports change to the decided HA configuration to the user via the HA requirement setting unit 123. The notification may be made to not only the HA requirement setting unit 123 that has inputted HA requirements, but also the HA requirement setting unit of other slave cluster programs 220. After executing S215, it performs setting change of the selected HA configuration (S215).

Figure 12:
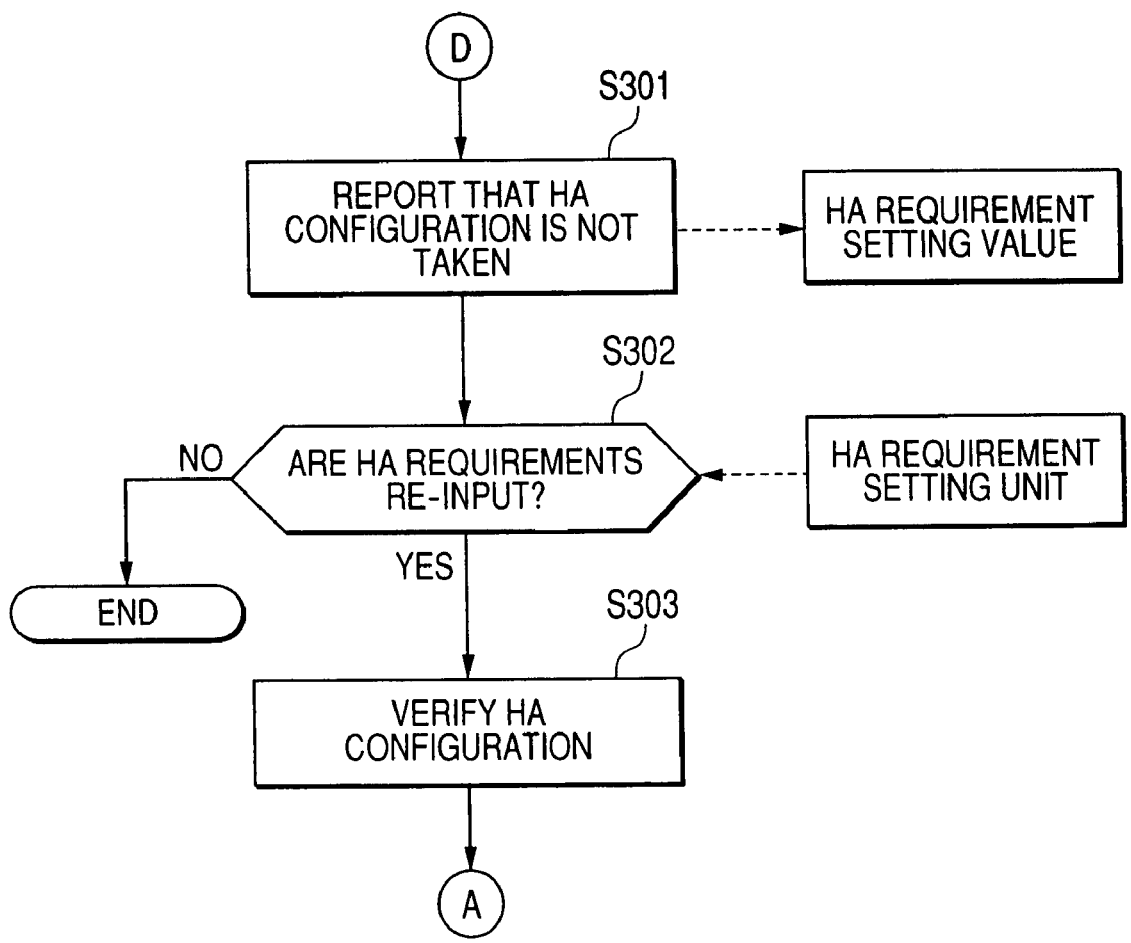
FIG. 12 also shows a first embodiment and is a flowchart showing error notification processing of HA requirement definition performed by a master cluster program of an active system (third processing)

FIG. 12 is a flowchart showing an example of third processing performed when the HA configuration determining unit 527 reports an error to the user (or manager) via the HA requirement setting unit when it is determined in any of S106 of FIG. 10, and S203 and S211 of FIG. 11 that no realizable HA configuration exists.

The HA configuration determining unit 527 reports to the user the result that no selectable HA configuration exists, via the HA requirement setting unit 123 (S301). For example, the HA requirement setting unit 123 shows to the user the result that "no selectable HA configuration exists", using the display of the execution result shown in the UI 2301 in FIG. 8. After that, it determines whether the user has modified the HA requirements for reinput via the HA requirements setting unit 123 (S302), and when no reinput is made, stops realizing the HA configuration for the HA requirements. On the other hand, when HA requirements have been reinputted by the user, it again verifies the HA requirements (S303). To perform the re-verification in S303, it re-executes from S101.

From the above processing, the HA configuration determining unit 527 of the master cluster program 520 sets an HA configuration that meets HA requirements of the entire system and is based on priority, from HA requirements for each of user-set applications AP and HA requirements of the entire system, and updates the HA configuration pattern table 528.

Figure 13:
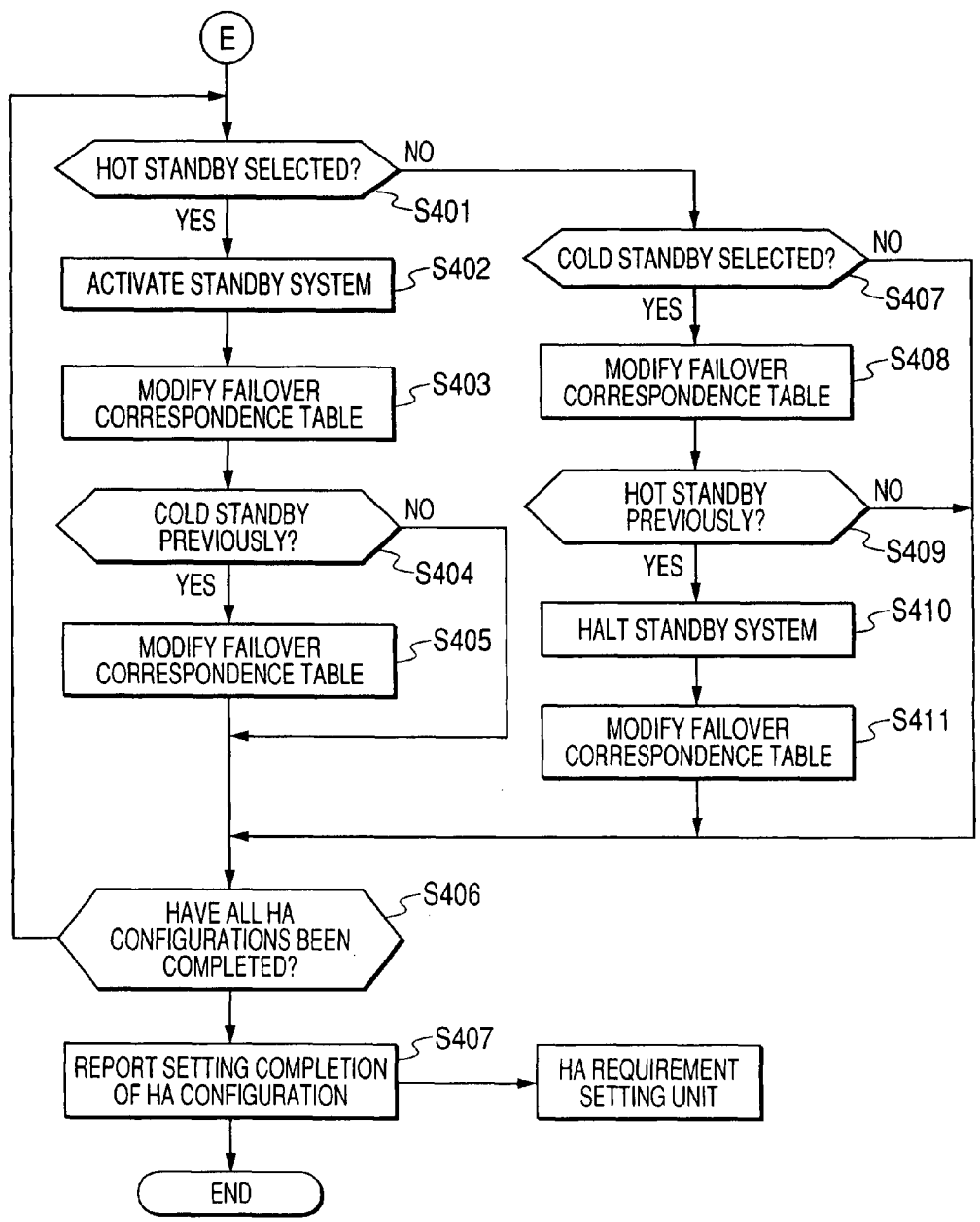
FIG. 13 also shows a first embodiment and is a flowchart showing setting processing of HA requirement definition performed by a master cluster program of an active system (fourth processing)

FIG. 13 is a flowchart showing an example of fourth processing corresponding to the S215 where the HA configuration determining unit 527 performs the setting of HA configuration.

The HA configuration determining unit 527 determines whether a hot standby has been selected in the HA configuration decided in S212 or S213 of FIG. 11 (S401). When a hot standby has been selected, it activates a standby system (S402), and after achieving a hot standby configuration, reflects the activated standby system in the failover correspondence table 526 (S403). Additionally, it determines whether the HA configuration set previously is a cold standby (S404), and when so, deletes the entry of the cold standby from the failover correspondence table 526 (S405). After processing of S405 terminates, it executes S406.

On the other hand, in the S401, when the decided HA configuration is not addition of a hot standby, it determines whether a cold standby has been selected (S407). When a cold standby has been selected, it adds the entry of the cold standby to the failover correspondence table 526 (S408). After that, it determines whether the HA configuration set previously in the failover correspondence table is a hot standby and (S409). When a hot standby has been set, it halts a standby system having been used in the hot standby (S410), and deletes the entry of the hot standby from the failover correspondence table 526. After the processing of S411 terminates, it executes Step S406.

On the other hand, when it is determined in S407 to be not a cold standby, since it means that change of HA configuration is not necessary, S406 is executed. Here, the failover correspondence table 526 is updated twice in Steps S403, S405, S408, and S411, considering the case where different failover methods are defined as different entries. For example, however, when one failover method is applied to one application, the failover correspondence table 526 may be updated only once, and in this case, for example, S404, S405 or S408 may be omitted.

The HA configuration determining unit 527 determines in S406 whether other HA configurations not set exist, and when they exist, executes Step S401 to perform setting of the next HA configuration. On the other hand, when other HA configurations not set do not exist, since settings of all HA configurations have been terminated, the HA configuration determining unit 527 notifies the user of the completion of HA configurations (S407), and terminates the setting of HA configurations. The HA configuration completion by S407 may be indicated by notification of a failover method set within the execution result window as shown by the UI 2301 of FIG. 8, for example.

In this embodiment, an example of one-to-one HA configuration including one active system and one standby system has been described. However, M-to-N HA configuration including plural active systems and standby systems is also permitted. For example, the failover correspondence table 526 shown in FIG. 6 can be applied by using a table relating plural active systems and standby systems.

In this embodiment, in the two failover methods, cold standby and hot standby, an example is shown that selects a failover method to change an HA configuration. However, another method of recovering a guest OS to a normal state may be used. For example, recovery may be performed by restarting a guest OS, or snap shot of an active guest OS may be created for recovery by use of the snap shot. Also in this case, the failover correspondence table 526 can be applied by adding elements for use of the recovery method.

By performing the processes shown in FIGS. 1 to 13, based on HA requirements inputted from the HA requirement setting unit 123 of the slave cluster program 120 of the active system, master cluster program 520 can realize an HA configuration by use of a failover method meeting the HA requirements. Additionally, even when HA requirements of the entire system, and HA requirements are set by the slave cluster program 220 on another guest OS to realize another HA configuration, an HA configuration can be realized by selecting failover methods meeting HA requirements of plural guest OSs.

Thereby, the user and the manager do not need to finely specify a failover destination and a failover method for each of applications and LPARs, and have only to set HA requirements to perform desired failover for each of applications. The host cluster program 520 can decide an optimum failover destination and failover method. Therefore, in a computer system in which plural applications and LPARs are operated, even when logical or physical configuration of a computer of a failover destination is changed, an optimum failover destination can be selected to prevent extra consumption of computer resources of the failover destination, and efforts of the user and the manager can be significantly reduced.

When no HA configuration can be realized, the HA configuration determining unit 527 notifies the user that it cannot be realized, and prompts the user to again input HA requirements, thereby eliminating an inadequate failover method. Thereby, in a cluster system having plural failover methods, an HA configuration employing a failover method meeting HA requirements required by the user can be realized, and the first and second problems described previously can be solved. Thereby, a failover method that allow free changes of failover methods is realized, and cluster configuration suitable for high availability desired by the user can be provided even when computer configuration is logically or physically changed.

Second Embodiment

FIGS. 14 to 18 show a second embodiment of the present invention, which is realized by partially changing the first embodiment.

Figure 14:
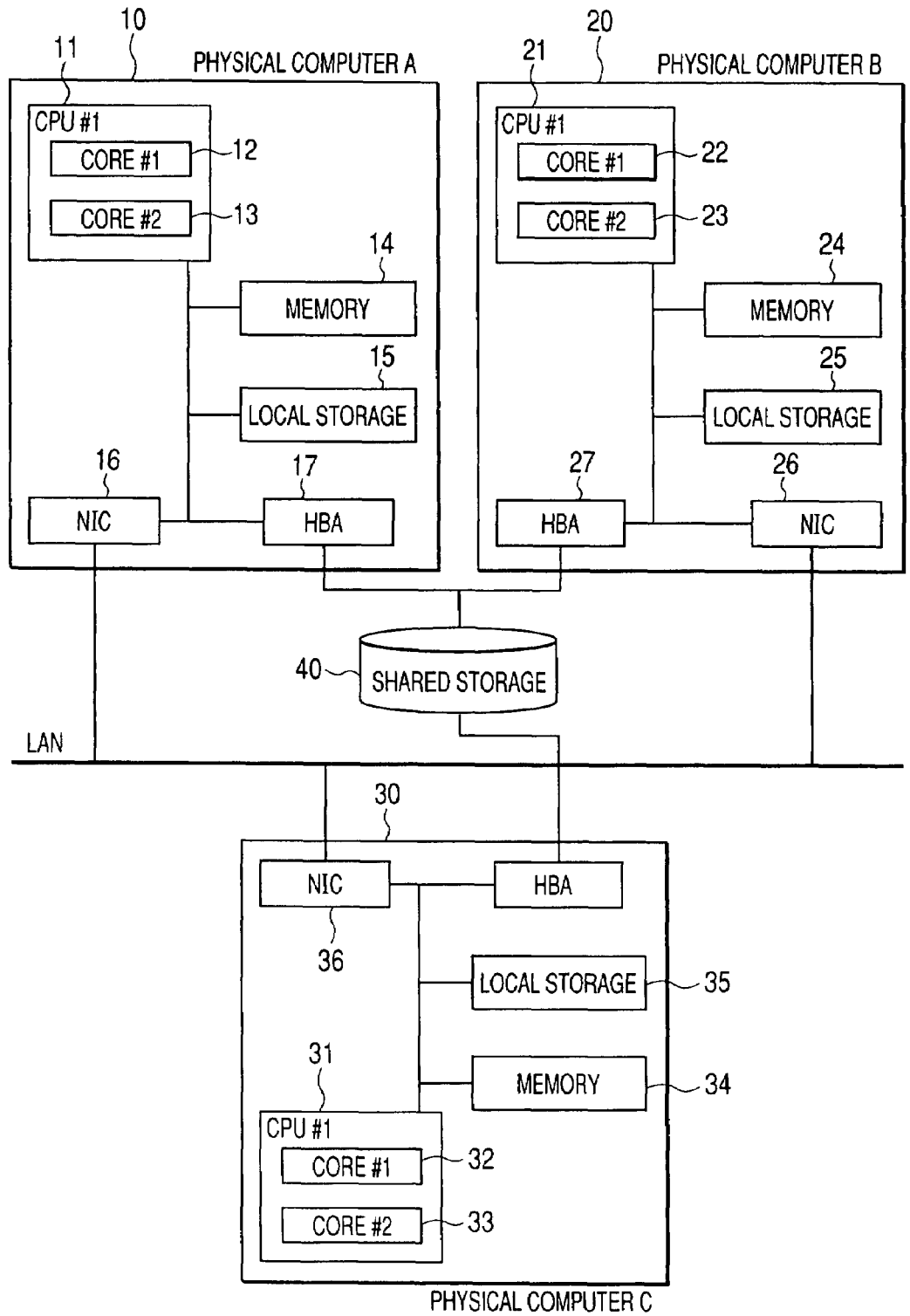
FIG. 14 shows a second embodiment and is a block diagram indicating the hardware configuration of a physical computer of a server virtualization environment.

FIG. 14 shows a second embodiment and is a block diagram indicating the hardware configuration of a physical computer of a server virtualization environment of the second embodiment. FIG. 14 is a partially changed version of FIG. 1 of the first embodiment. Other configurations are the same as those in the first embodiment.

In FIG. 14, a physical computer C is newly added to the configuration of the first embodiment. Individual elements of the physical computer C have the same construction as the physical computers A and B.

Figure 15:
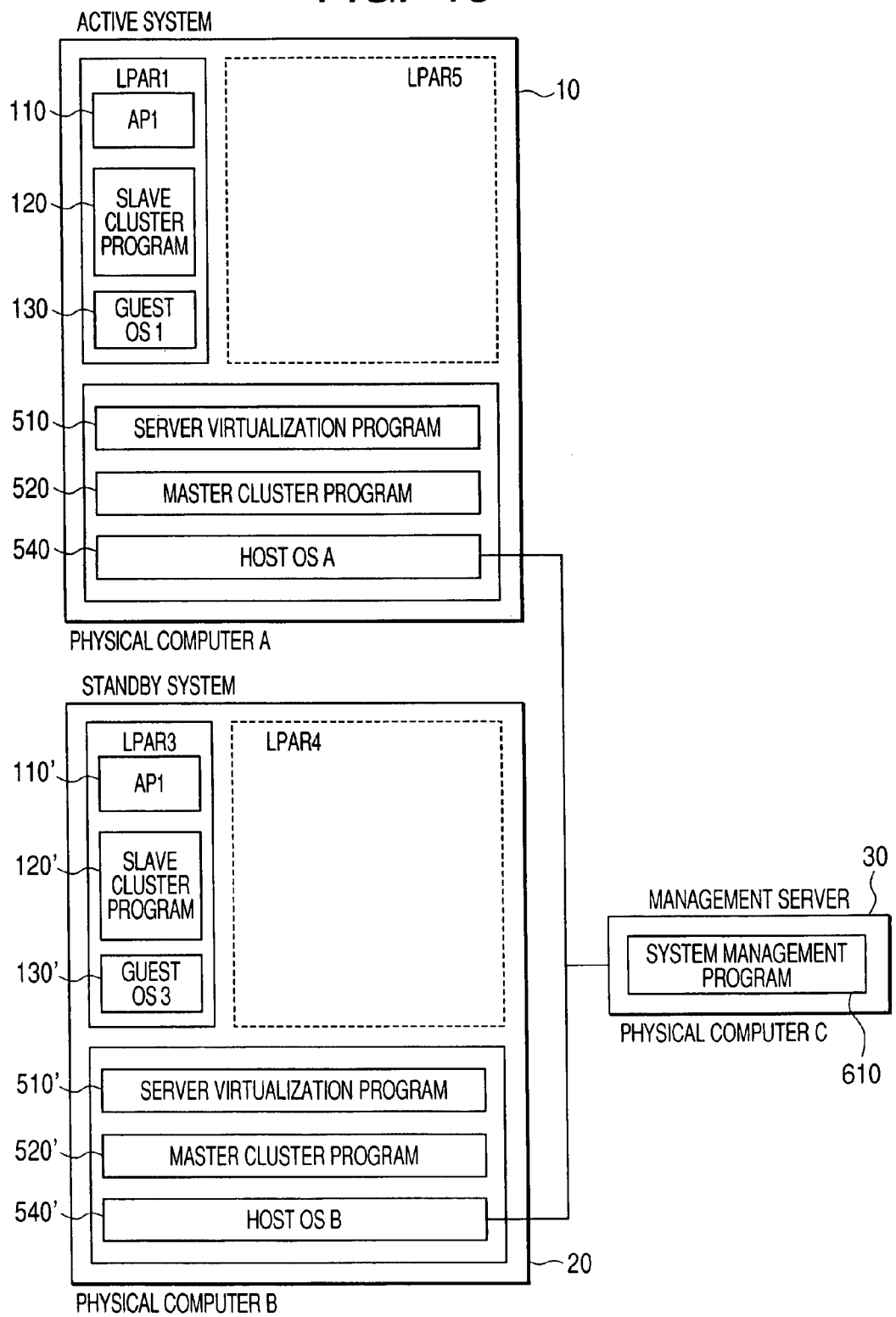
FIG. 15 also shows a second embodiment and is a functional block diagram centering around software of a server virtualization environment that is executed in a physical computer.

FIG. 15 is a functional block diagram centering around software of the server virtualization environment in the physical computer shown in FIG. 1. FIG. 15 is a partially changed version of FIG. 2 of the first embodiment. Other configurations are the same as those in the first embodiment.

In FIG. 15, on the physical computer C, a management server 30 including a system management program 610 is formed. The management server 30 produces an activation disk for activating new guest OSs on host OSs 540 and 540' of systems constituting a cluster system.

Figure 16:
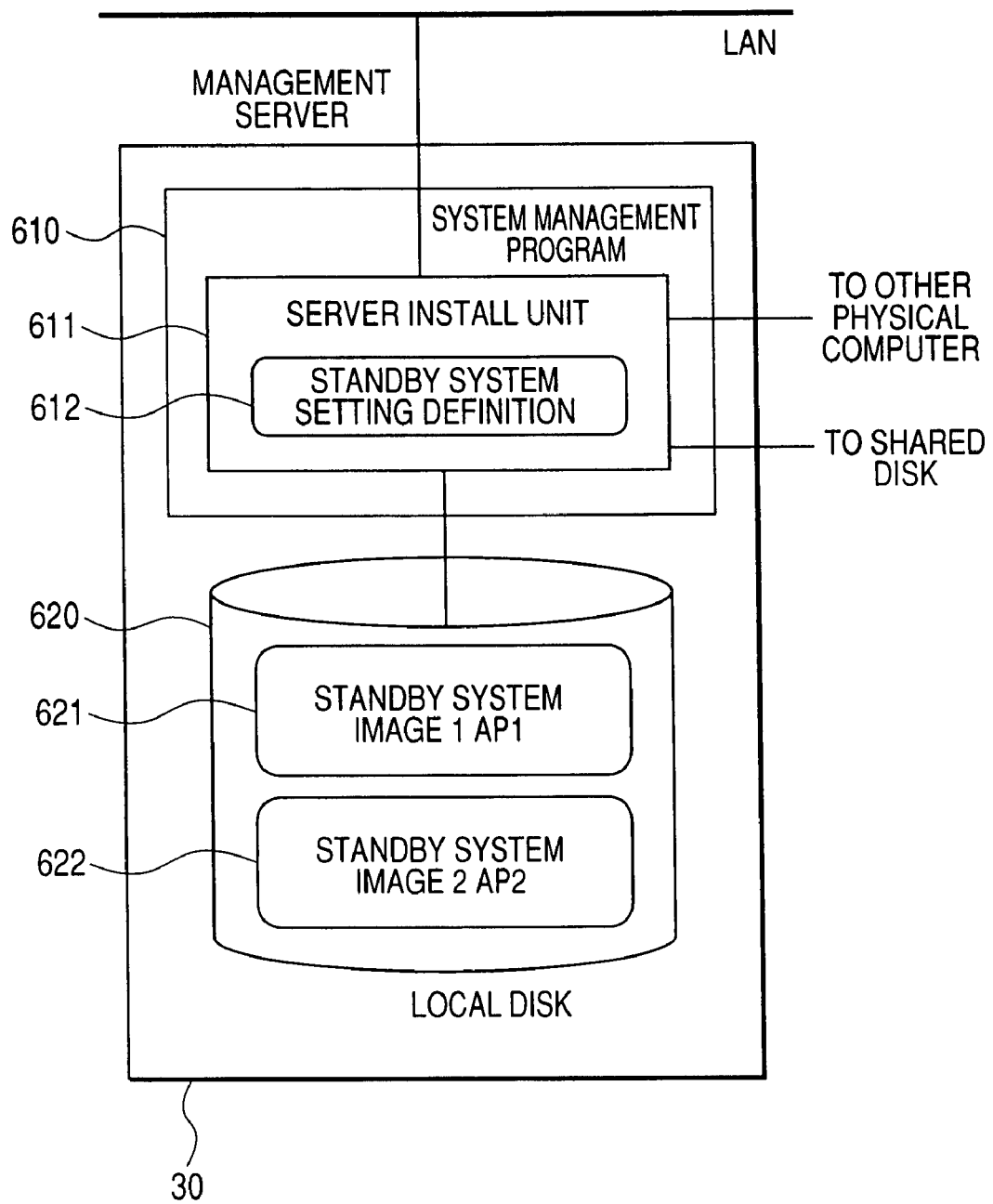
FIG. 16 also shows a second embodiment and a block diagram showing a detailed configuration of software executed in a physical computer C that functions as management server 30.

FIG. 16 is a block diagram showing a detailed configuration of software executed in the physical computer C that functions as the management server 30. The physical computer C includes a management program 610 that includes a server install unit 611 that generates activation disks 42 and 44 (see FIG. 4) on the sharing storage device 40 used to activate a guest OS as a standby system, of guest OSs of individual systems constituting a cluster system, and a local disk including standby activation disk images 621 and 622 corresponding to individual applications used to generate the activation disks 42 and 44 for the standby system.

The server install unit 611 has a standby system setting definition 612. The standby system setting definition 612, as shown in FIG. 17, includes an identifier 1304 representative of an original activation image to generate an activation disk, as setting required by applications 1311 and 1312 specified by the application identifier 1301 to use a standby system by hot standby, and install information 1303 for producing an activation disk from an activation disk image specified by the identifier 1304.

The install information 1303 includes information about resources shared with an active system, and scripts executed at activation. The resources may include shared disks and IP addresses shown in FIG. 17, as well as World Wide Name of HBA. The server install unit 611, by using the standby system activation disk images 621 and 622 and the standby system setting definition 612, produces the activation disks 42 and 44 for executing a standby system of each application, and stores them on the shared storage device 40.

Figure 18:
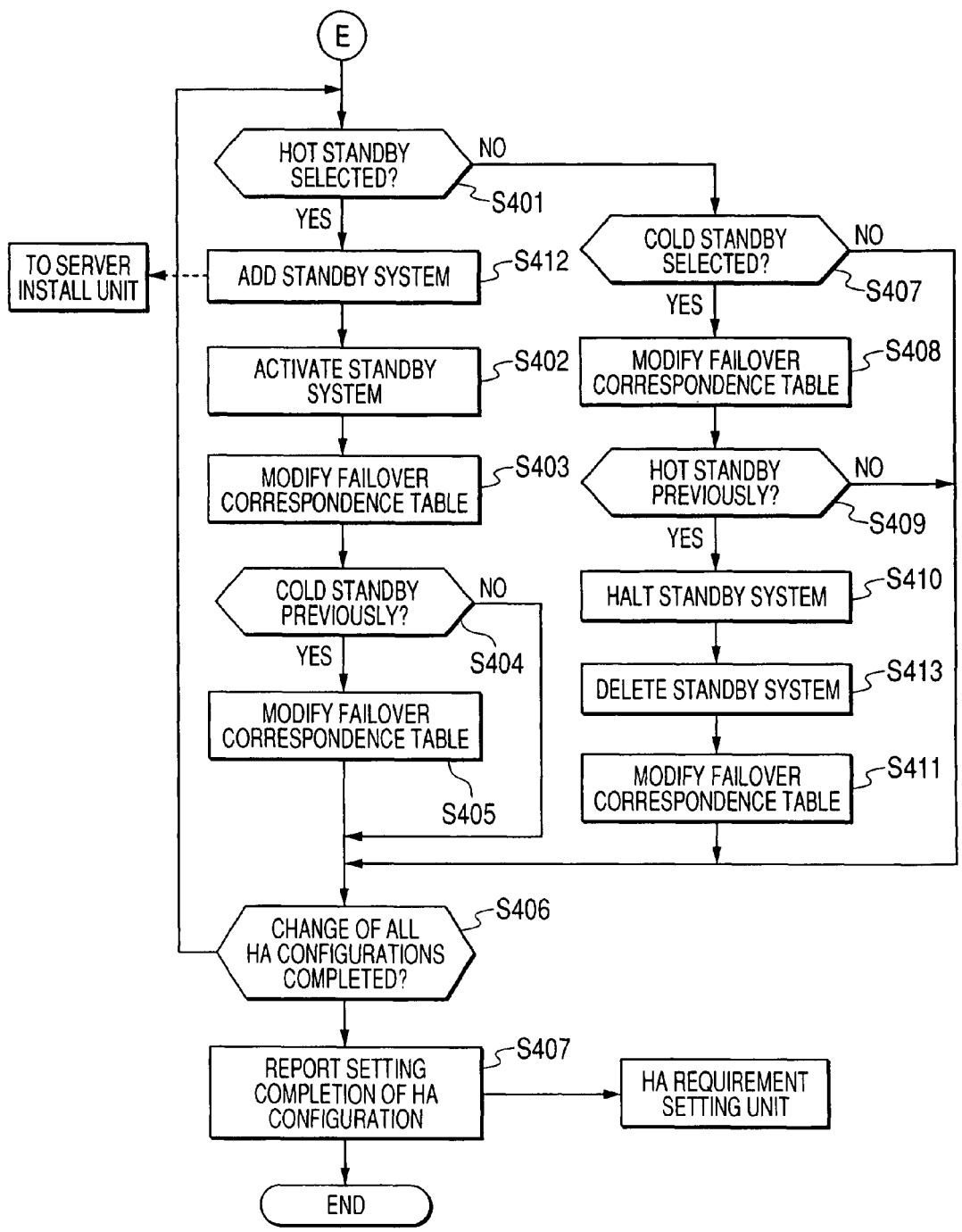
FIG. 18 shows a third embodiment and is a flowchart showing an example of processing that an HA configuration determining unit of a master cluster program generates a standby activation disk and performs setting of HA configuration.

FIG. 18 is a flowchart showing an example of processing that the HA configuration determining unit 527 on the master cluster program 520 produces an activation disk of a standby system via the server install unit 611. This flowchart is a partially changed version of FIG. 13 of the first embodiment.

In FIG. 18, in S401, when an HA configuration by a hot standby is selected in S212 or S213 shown in FIG. 11 of the first embodiment, the HA configuration determining unit 527 commands the server install unit 611 to produce an activation disk of a standby system to activate the standby system, and adds the standby system (S412). After that, like S402 and following steps in FIG. 11, it activates the standby system, and updates the failover correspondence table. In S409, when an HA configuration by a cold standby is selected, and a hot standby configuration was realized previously, after halting the standby system, it deletes the standby system by deleting the activation disk of the standby system (S413). After that, it executes S411 and following steps in FIG. 11, and updates failover correspondence table 526.

By performing the processes shown in FIGS. 14 to 18 as described above, based on the HA requirements inputted from HA requirements setting unit 123 of the slave cluster program 120 of the active system, when the master cluster program 520 realizes an HA configuration by use of a failover method meeting the HA requirements, even when a standby disk does not exist previously and a standby system cannot be activated, it produces the activation disks 42 and 44 of the standby system only when a failover method by hot standby that uses the standby system is used. When a failover method by cold standby is used, unnecessary standby activation disks can be deleted. Thereby, in this embodiment, in addition to the first embodiment, the second problem can be further solved by preventing unnecessary consumption of resources caused by realization of excessive failover methods. Thereby, freely changeable failover methods are realized, and even when a configuration is logically or physically changed, a cluster configuration suitable for high availability desired by the user can be provided with less resource amounts.

Third Embodiment

FIGS. 19 to 23 show a third embodiment in the present invention. The third embodiment is realized by partially changing the second embodiment.

Figure 19:
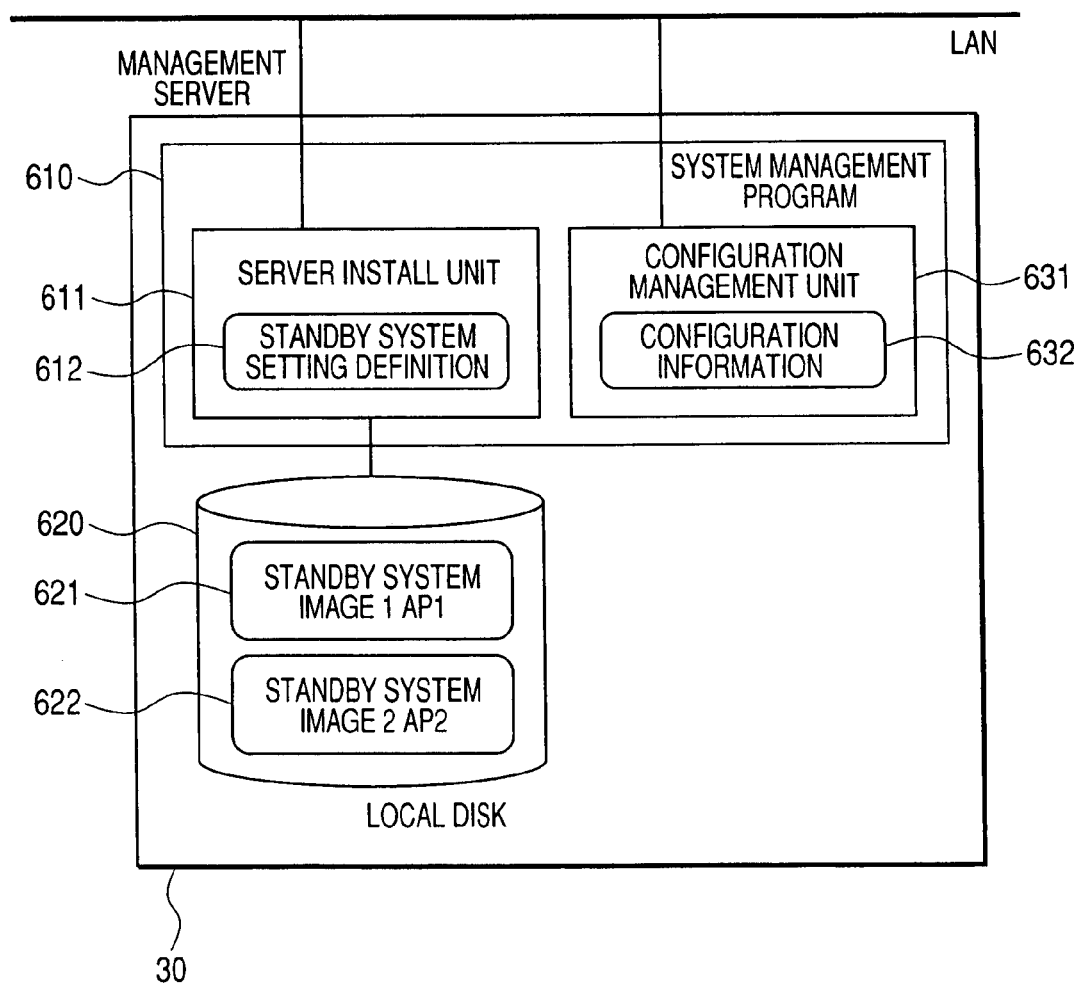
FIG. 19 shows a third embodiment and is a block diagram showing a detailed configuration of software executed in a physical computer C that functions as a management server.

FIG. 19 is a block diagram showing a detailed configuration of software executed in the physical computer C that functions as the management server 30 of the third embodiment, and is a partially changed version of FIG. 16 of the second embodiment. Other configurations are the same as those in the second embodiment.

In FIG. 19, the system management program 610 newly includes a configuration management unit 631. The configuration management unit 631 has configuration information 632 on physical computers, host OSs, guest OSs, and applications that constitute a cluster system. The configuration information refers to information on physical or logical computer resource used in a state in which physical computers, host OSs, LPARs, guest OSs, and applications that constitute a cluster system continue to operate or remain halted. The information on these computer resources refers to steady information that will not change. For example, the configuration information 632, as shown in FIG. 20, as information about physical computers and logical computers, includes computer identifier 1401, power consumption capacity 1402, information 1403, 1404, and 1405 indicating types of CPU, NIC, and HBA respectively, and physical memory capacity 1405. Additionally, as configuration information that changes only during execution of host OS or guest OS, the following information is included: power-on state 1406, empty memory capacity 1407, available memory amount 1408, operating host OS 1410, LPAR 1411, guest OS 1412, and application 1413. The configuration management unit 631, which collects configuration information included in the configuration information 632, has a function to detect a change in computer resources if any, and a function to report the change to the master cluster program 520' on other physical computers via LAN.

FIG. 21 is a flowchart showing an example of first processing that, in the third embodiment, the HA configuration determining unit 527 of the master cluster program 520 verifies HA configuration upon reception of notification of configuration change from the configuration management unit of the management server.

In FIG. 21, when the HA configuration determining unit 527 receives notification of configuration change from the configuration management unit 621 (S501), it verifies whether a current HA configuration is appropriate (S502). In this verification, to determine whether a current HA configuration meets HA requirements, HA configuration setting processing consisting of Step S101 and following steps in FIG. 10 of the first embodiment are again executed. As the HA requirements used for the verification, an HA requirement definition may be acquired from the HA requirement setting unit 123 of the slave cluster programs 120 and 220 on each guest OS, or a previously set HA requirement definition stored in the master cluster program may be used.

When an HA configuration has become unrealizable as a result of the verification, error notification processing D described in FIG. 12 is performed to notify the user that an HA configuration has become unrealizable (S301), and the HA configuration determining unit 527 accepts reinput of HA requirements from the user (S302). Thereby, when an appropriate failover method cannot be applied, solution by the user can be achieved. On the other hand, when an HA configuration can be realized, HA configuration setting processing E described in FIG. 13 is performed to notify the user that an HA configuration has been newly set (S407). Examples of information given by the S407 are UIs (user interface) shown in FIGS. 22 and 23.

The UI shown in FIG. 22 represents a UI sent to the user via the HA requirement setting unit 123 of the slave cluster program 120 of the application in which an HA configuration is changed. The UI 2301 displays a configuration change status, and whether the change is approved can be selected by the user through the UI. For example, when the user does not approve the change, the HA requirements can be changed, and in this case, HA configuration can be realized by performing the same processing as HA requirement change input in the S302. The UI of FIG. 23 represents UI for notification to the HA requirement setting unit 123 on the slave cluster program 120 other than the application in which HA configuration is changed. The UI includes UI 2501 as alert to indicate that the HA configuration of other applications was changed, and like FIG. 22, includes UI for indicating whether the HA configuration is approved by S2401. The UI of FIG. 23 may be notified to all applications, or may be used for notification to applications in which HA configuration was changed, and applications for which HA requirements for the entire system are set.

This embodiment has been described based on the second embodiment. However, even in the management server 30 in which the server install unit 611 does not exist, also when an activation disk of a standby system in the second embodiment is not newly added, that is, when an activation disk of a standby system already exists, this embodiment can be applied. Additionally, even in the management server 30 in which the configuration management unit 631 does not exist, if HA configuration is not changed in the third embodiment, this embodiment can be applied.

Furthermore, although, in this embodiment, an example of adding and deleting an activation disk of a standby system based on change of a failover method has been described, in the case of hot standby, this embodiment can be applied also when a server activated by a standby system is changed (server migration of a standby system is executed). For example, with a failover method changed from hot standby to cold standby to halt an operating standby system of hot standby and delete an activation disk, after activating an activation disk of a standby system corresponding to a new migration destination, this embodiment can be applied by changing the failover method from cold standby to hot standby. Furthermore, with a failover method changed from hot standby to cold standby, after migrating a guest OS of standby system to another physical computer by using known technology for migrating a guest OS of standby system across plural host OSs, this embodiment can be applied when the failover is changed from cold standby to hot standby using the standby system having been migrated. Additionally, like the first embodiment, when HA configuration of M-to-N configuration including plural active systems and standby systems is targeted, this embodiment can be applied. For example, by switching an active system to be migrated to another active system or standby system temporarily, after performing the server migration of standby system as a standby system, this embodiment can be applied by changing a server that has become a standby system in a migration destination to an active system by failover from another active system. As another realization method, for example, after changing HA configuration so as to newly add a standby system of migration destination and switching an active system of migration source to be migrated to the added standby system, this embodiment can be applied by halting and deleting the system of the migration source that has become a standby system.

According to the third embodiment shown in FIGS. 19 to 23, when the configuration of physical computer, host OS, guest OS, and application as system components that constitute a cluster system is physically or logically changed, the master cluster program 520 determines whether an HA configuration by use of a failover method meeting HA requirements is selectable, to realize HA configuration. When an HA configuration cannot be realized, it notifies the user of the fact and prompts the user to again input HA requirements, thereby eliminating an inadequate failover method. Thereby, in a cluster system having plural failover methods, even when a configuration is changed, an HA configuration can be realized using a failover method meeting HA requirements needed by the user, so that the first and second problems described previously can be solved in a wider cluster system than the second embodiment. Thereby, freely changeable failover methods can be realized, so that even when a configuration is logically or physically changed, a cluster configuration suitable for high availability desired by the user can be provided.

Fourth Embodiment

FIGS. 24 to 29 show a fourth embodiment in the present invention. The fourth embodiment is realized by partially changing the third embodiment.

Figure 24:
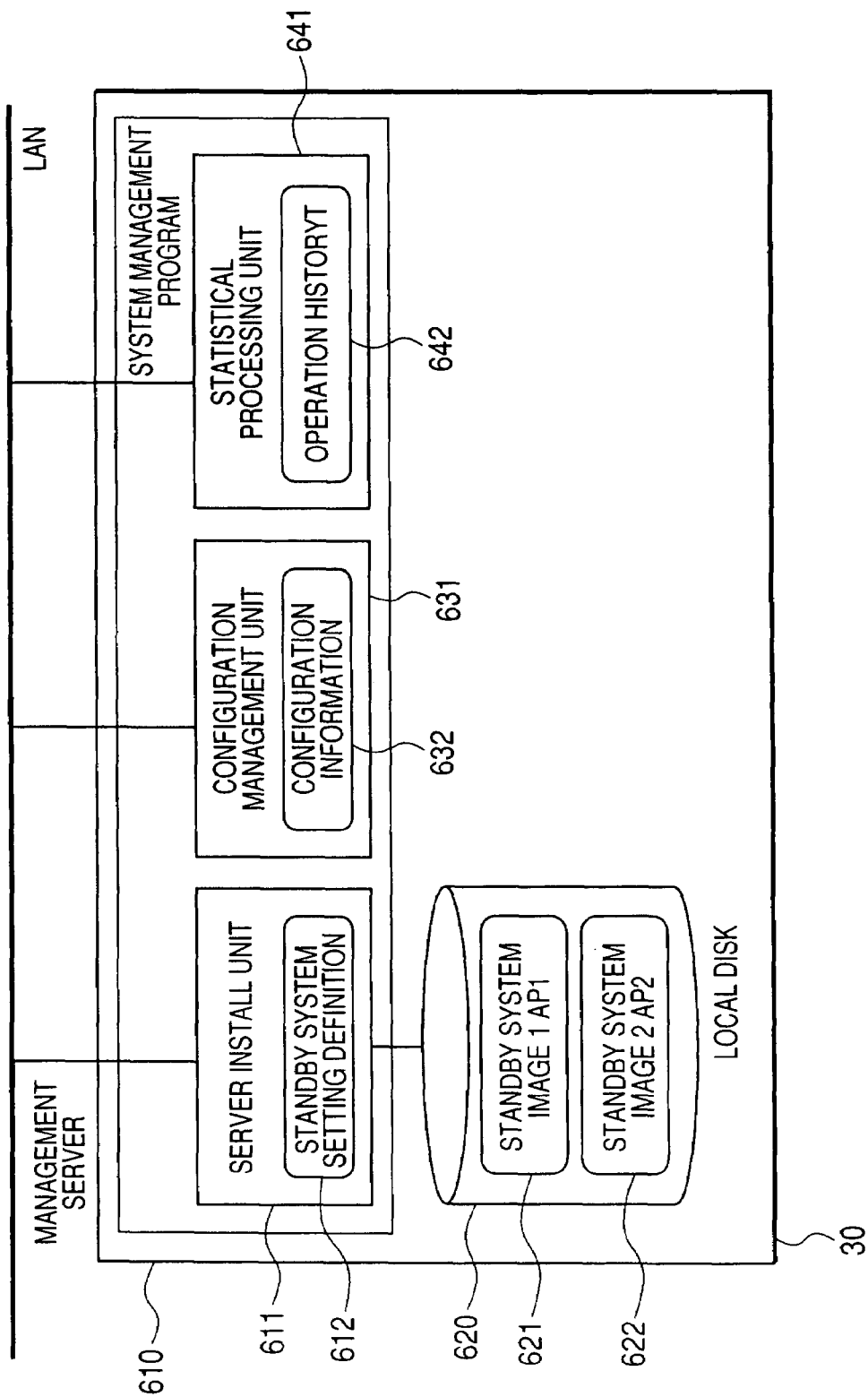
FIG. 24 shows a fourth embodiment and is a block diagram showing a detailed configuration of software executed in a physical computer C that functions as a management server.

FIG. 24 is a block diagram showing a detailed configuration of software executed in a physical computer C that functions as a management server of the fourth embodiment, and is a partially changed version of FIG. 19 of the third embodiment. Other configurations are the same as those in the third embodiment.

In FIG. 24, the system management program 610 newly includes a statistical processing unit 641. The statistical processing unit 641 has an operation history 642 on physical computers, hosts OS, guests OS, and applications that constitute a cluster system. The operation history 642, as shown in FIG. 25, for example, includes information 1501 on objects that applications and guest OSs that performed failover operate, information 1502 representative of the content of operation, and numerical information 1503 such as time required for operation and performance. For example, the information 1501 includes the identifiers of components of the cluster system related to operation objects. For example, in FIG. 25, there are identifiers of computers, LPARs, host OSs, guest OSs, and applications. In addition to them, elements constituting the cluster system may be included. For example, CPU, NIC, and HBA may be included. The information 1502 includes information indicating the content of the operation performed by the information 1501, and includes information indicating operation contents related to HA requirements. For example, time required for failover at failure, and information about the performance of applications such as response time of the applications and IO performance by HBA may be included. Information related indirectly to HA requirements instead of direct HA requirements may be included. The indirect information is information capable of generating information corresponding to HA requirements, such as failure occurrence time, failure detection time, application activation time, and time having been taken for individual operations. In this case, by processing these pieces of information, information of failover time for HA requirements such as application halt permissible time can be acquired.

The statistical processing unit 641 periodically passes operation status related to HA requirements to the HA configuration determining unit 527 of the master cluster program 520, based on the operation history 642. Which information of the operation history 642 is related to HA requirements may be previously set by the user.

FIG. 26 is a flowchart showing an example of processing that, in the fourth embodiment, the HA configuration determining unit 527 of the master cluster program 520 verifies HA configuration upon reception of notification of operation status on HA requirements from the statistical processing unit 641 of the management server 30.

In FIG. 26, on receiving notification of configuration change from the statistical processing unit 641 (S601), the HA configuration determining unit 527 updates information corresponding to the current HA configuration pattern table 528, based on operation status (S602), and verifies whether a current HA configuration is appropriate (S603). The verification, like the step S502, is realized by again performing HA configuration setting processing consisting of the step S101 and following steps to determine whether the current HA configuration is appropriate for the HA requirements. When a new HA configuration is set by the HA configuration setting processing, or when an HA configuration cannot be realized, the same processing as S502 shown in the third embodiment is performed. In the case of the latter, an HA configuration can be realized by changing user's HA requirements. An example of the HA configuration pattern table 528 updated in S602 includes HA requirements 1207, 1208, and 1209 related newly to operation status as shown in FIG. 27. For example, the HA requirement 1207 is a response performance of application, HA requirement 1208 is IO performance of the sharing storage device 40 by HBA, and HA requirement 1209 is a maximum CPU utilization ratio available after failover is performed by a failover method. Aside from them, HA requirements newly added may be operation status that always varies with operation of components that realize an HA configuration, and may be utilization ratios of NIC and HBA shared by a virtual server.

Correspondingly to the HA configuration pattern table 528, the HA requirements definition 124 of the HA requirement setting unit 123 of the slave cluster program 120, as shown in FIG. 28, are newly added with HA requirements 1306 to 1308 corresponding to the HA requirements 1207, 1208, and 1209, in addition to the requirements shown in FIG. 9 of the first embodiment. A UI for setting the HA requirements definitions can be newly specified in UI 2101 as shown in FIG. 29. Thereby, the user can specify definitions of an HA configuration based on operation states, and can select a failover method having a failover destination that delivers adequate performance after failover.

Although this embodiment has been described based on the third embodiment, this embodiment can be applied in the case where an activation disk of a standby system in the second embodiment is not newly added even in the management server 30 in which the server install unit 611 does not exist. Additionally, even in the management server 30 in which the configuration management unit 631 does not exist, this embodiment can be applied in the case where an HA configuration is not changed in the third embodiment.

Although an example of HA configuration of one-to-one configuration including one active system and one standby system has been described in this embodiment, HA configuration of M-to-N configuration including plural active systems and standby systems is also permitted like the first embodiment. Furthermore, in the case of HA configuration of M-to-N configuration, based on AP response request performance and IO request performance in the HA requirement definition table shown in FIG. 28, change to an HA configuration meeting the performance may be included. For example, when an active system in which AP response performance is lacking exists, by using an HA configuration change method accompanied by migration of an active system described in the third embodiment, the active system lacking in performance can be migrated to a position meeting performance.

Additionally, HA requirements and operation status in this embodiment may be those that relate to such information as to influence the operation of guest OSs, applications, and cluster programs. For example, communication throughput by a network is also permitted. Furthermore, the HA requirements and operation status may be information limited between components of a specific system. For example, communication throughput when guest OSs, applications, and cluster programs communicate with one another, and IO performance of specific storage devices are also permitted. Thereby, even when communication performance among plural applications and IO performance of storage devices are demanded like a Web three-level hierarchical model, an HA configuration can be changed to realize such an HA configuration as to meet the performance.

Furthermore, HA requirements utilizing operation status may include information directly showing the dependence of applications on an HA configuration. For example, there is the dependence of each application on a physical position as a failover destination and a failover method. Thereby, the user can select HA configuration operating on different guest OSs of a virtual server having a Web layer and an AP layer of the same level in a Web three-level hierarchical model (application system).

According to the fourth embodiment shown in FIGS. 24 to 29, even when the operation of components of a system constituting a cluster system such as physical computers, host OSs, guest OSs, and applications makes the performance of the guest OSs and applications invariable, the master cluster program 520 defines requirements about performance state in HA requirements to determine whether an HA configuration using a failover method meeting the HA requirements can be selected, and can realize the HA configuration. Thereby, in a cluster system having plural failover methods, even when the performance of the cluster system changes as a result of operation of plural applications, an HA configuration using a failover method meeting HA requirements that specify performance needed by the user can be realized, and the first and second problems described previously can be solved in a wider cluster system than in the third embodiment. Thereby, freely changeable failover methods are realized, and even when load states of applications change, a cluster configuration suitable for high availability desired by the user can be provided.

Fifth Embodiment

FIGS. 30 to 33 show a fifth embodiment, which is realized by partially changing the third embodiment.

FIG. 30 is an HA requirement definition 124 representative of HA requirements in terms of operation cost aspects of the entire system that can be set by the slave cluster program 120.

FIG. 30 shows, as new HA requirements of the entire system, a requirement 1601 that specifies power consumption of the entire system, and a requirement 1602 that specifies an upper limit of the number of licenses of applications of the entire system. FIG. 31 shows an example of UI for specifying these HA requirements. Each HA requirement can be specified by a UI 2101 for specifying HA requirements of the entire system because it is set as an HA requirement of the entire system.

These HA requirements can be determined by using the configuration information 632 managed by the configuration management unit 631 of the management server 30 in the third embodiment. As for the configuration information 632, for example, the power consumption requirement 1601, as shown in FIG. 32, can be determined from power consumption 1402 and power-on state 1407, and the number of licenses can be determined from operation application information 1413. For example, as shown in the configuration information 632 of FIG. 32, in a system in which AP 1 takes an HA configuration by hot standby in the LPAR 1 and LPAR 3 of the physical computers A and B, as shown in FIG. 31, HA requirements of cold standby priority of AP 2 are added, and it is assumed that AP 2 consumes 2 GB of memory. In this case, since a minimum of power consumption takes precedence, when the AP 1 may take HA configuration by cold standby, as shown in FIG. 33, an HA configuration in which both the AP 1 and the AP 2 operate on the physical computer A, and the physical computer B is in power off is realized. As a result, power consumption of the physical computer B can be reduced, and computer resources can be released.

According to the fifth embodiment shown in FIGS. 30 to 33, by defining operation costs of a cluster system as an HA requirement, it is determined from configuration information whether an HA configuration using a failover method meeting the HA requirement by the operation costs can be selected, so that the HA configuration can be realized. Thereby, in a cluster system having plural failover methods, even when operation costs are curbed, an HA configuration using a failover method meeting HA requirements that specify performance needed by the user can be realized, so that the second problem described previously can be further solved. Thereby, freely changeable failover methods are realized, and even when load states of applications change, a cluster configuration suitable for high availability desired by the user can be provided.

As has been described above, the present invention can apply to a virtualization server environment that takes a cluster configuration. Particularly, the present invention is suitably applied to systems required to quickly recover because an appropriate failover can be realized even when a failure occurs.

What is claimed is:

1. A cluster system failover method for a computer system in which a plurality of virtual computers are executed on at least one physical computer that includes a virtualization unit for providing the virtual computers, the failover method comprising:

setting, for each of the virtual computers, a respective plurality of associations between a failover destination candidate that is switchable to at failure of the virtual computer and a failover method candidate in which the failover destination candidate of each association is a different virtual computer of the plurality of virtual computers and the failover method candidate is a failover method of a plurality of failover methods that include hot standby and cold standby;

setting, for each of the virtual computers, respective failover requirements that are required for determining a failover destination and a respective failover method for switching to the failover destination for the virtual computer, the respective failover requirements for each of the virtual computers being based on a correspondence between the failover destination candidates and the failover method candidates that include hot standby and cold standby;

selecting, for each of the virtual computers, one association of the respective plurality of associations between failover destination candidates that are switchable to at failure of the virtual computer and failover method candidates that include hot standby and cold standby for the virtual computer based on the respective failover requirements for the virtual computer;

setting, for each of the virtual computers, the failover destination candidate of the selected association for the virtual computer as the failover destination at failure when the selected association for the virtual computer meets the respective failover requirements for the virtual computer, and the failover method candidate of the selected association for the virtual computer as the respective failover method for switching to the failover destination at failure for the virtual computer;

deciding, for each of the virtual computers, whether to activate or halt a system of the set failover destination for the virtual computer before a failure occurs based on whether the set failover method for the virtual computer is hot standby or cold standby; and for each virtual computer, switching the virtual computer to the set failover destination by using the set failover method for the virtual computer upon a failure occurring in the virtual computer.

2. The cluster system failover method of claim 1, wherein the respective failover requirements for each of the virtual computers include at least one of halt time of application programs during failover or a failover method.

3. The cluster system failover method of claim 1, wherein setting the failure destination and the respective failover method for each virtual computer further includes reporting the set failover method and the failover destination to a guest OS of the computer system.

4. The cluster system failover method of claim 3, wherein selecting, for each of the virtual computers, one association of the respective plurality of associations for the virtual computer based on the respective failover requirements for the virtual computer further includes, when a selectable association does not exist, reporting to the guest OS that no selectable association exists for the virtual computer.

5. The cluster system failover method of claim 4, when no selectable association exists, further comprising, when no selectable association exist for the virtual computer:

again setting the respective failover requirements for the virtual computer; and again selecting one association of the respective plurality of associations for the virtual computer based on the reset respective failover requirements for the virtual computer.

6. The cluster system failover method of claim 1, wherein setting, for each virtual computer, the respective failover requirements further includes, when a plurality of respective failover requirements are specified, setting priorities for the respective failover requirements, and wherein selecting one association of the respective plurality of associations for the virtual computer based on the reset respective failover requirements for the virtual computer is based on the priorities.

7. The cluster system failover method of claim 1, wherein setting, for each virtual computer, the respective failover requirements further includes setting priorities of failover for application programs, and wherein selecting, for each of the virtual computers, one association of the respective plurality of associations for the virtual computer based on the respective failover requirements for the virtual computer is based on the priorities of the application programs and include selecting an association with a higher priority placed on high availability for application programs of higher priority than for application programs of lower priority.

8. The cluster system failover method of claim 1, wherein setting, for each virtual computer, the respective failover requirements further includes updating existing respective failover requirements with respective failover requirements newly set, and wherein selecting, for each of the virtual computers, one association of the respective plurality of associations for the virtual computer based on the respective failover requirements for the virtual computer is based on the updated respective failover requirements.

9. The cluster system failover method of claim 8, further comprising, for each virtual computer, upon the respective failover method set for the virtual computer being changed from hot standby to cold standby, generating an activation disk for activating a system concerned at a failover destination.

10. The cluster system failover method of claim 1, wherein setting, for each virtual computer, the respective failover requirements further includes requirements on operation costs of the entire physical computer.

11. The cluster system failover method of claim 1, further comprising:

acquiring physical or logical configuration of the computer system and storing it in configuration information; and determining that the configuration information has changed, wherein selecting, for each of the virtual computers, one association of the respective plurality of associations for the virtual computer based on the respective failover requirements for the virtual computer includes again selecting one association meeting the respective failover requirements upon the configuration information changing, and wherein setting the failure destination and the respective failover method for each virtual computer further includes, when a failover destination indicated by the selected association is different from failover destination before the configuration information has changed, setting a new failover destination.

12. The cluster system failover method of claim 1, further comprising:

acquiring operation states of all systems as an operation history;

extracting an operation status corresponding to the respective failover requirements for each virtual computer from the operation history; and updating the correspondence between the failover destination candidates and the failover method candidates that include hot standby and cold standby when the operation status has changed, wherein setting the failure destination and the respective failover method for each virtual computer includes again selecting respective failover requirements, based on the updated correspondence between the failover destination candidates and the failover method candidates that include hot standby and cold standby.

13. A cluster system including:
a virtualization unit that operates a plurality of virtual computers on at least one physical computer that includes a virtualization unit for providing the virtual computers;
a plurality of systems having application programs that operate on each virtual computer; and
a cluster management unit that monitors the application programs or the virtual computers to switch the application programs to a different virtual computer at failure, the cluster system comprising:
a failover requirement setting unit that sets respective failover requirements for each of the virtual computers, the respective failover requirements for each of the virtual computers being based on a correspondence between failover destination candidates and failover method candidates that include hot standby and cold standby;
a failover configuration pattern setting unit that, for each of the virtual computers, sets a respective plurality of associations between a failover destination candidate that is switchable to at failure of the virtual computer and a failover method candidate in which the failover destination candidate of each association is a different virtual computer of the plurality of virtual computers and the failover method candidate is a failover method of a plurality of failover methods that include hot standby and cold standby; and
a failover configuration determining unit that selects, for each of the virtual computers, one association of the respective plurality of associations between failover destination candidates that are switchable to at failure of the virtual computer and failover method candidates that include hot standby and cold standby for the virtual computer based on the respective failover requirements for the virtual computer,
wherein the cluster management unit is further configured to:
set, for each of the virtual computers, the failover destination candidate of the selected association for the virtual computer as the failover destination at failure when the selected association for the virtual computer meets the respective failover requirements for the virtual computer, and the failover method candidate of the selected association for the virtual computer as the respective failover method for switching to the failover destination at failure for the virtual computer;
determine, for each of the virtual computers, whether to activate or halt a system of the set failover destination for the virtual computer before a failure occurs based on whether the set failover method for the virtual computer is hot standby or cold standby; and
for each virtual computer, switch the virtual computer to the set failover destination by using the set failover method for the virtual computer upon a failure occurring in the virtual computer.

14. The cluster system of claim 13, further including a management server connected to the physical computer,
wherein the management server includes a configuration management unit that acquires a physical or logical configuration of the physical computer and stores it in configuration information,
wherein the configuration management unit reports a change of the configuration information to the failover configuration determining unit when the configuration information has changed, and
wherein the failover configuration determining unit updates the failover configuration patterns, based on the report, and updates a failover method meeting the failover requirements and a failover destination meeting the failover requirements.

15. A cluster system failover method that monitors at least one physical computer including a virtualization unit that provides a plurality of systems that execute application programs on guest OSs, and the guest OSs or applications of the systems to switch the systems to a different system when a failure occurs in the guest OSs or the application programs, the cluster system failover method comprising:
for each of the systems, setting a switchable different system at failure, and any one of a plurality of preset failover methods as a failover candidate in a high availability configuration pattern;
for each of the systems, setting failover requirements required at failure as high availability requirements;
selecting one of the preset failover methods set in the high availability configuration patterns that meets the high availability requirements;
when a failover method meeting the high availability requirements exists, setting the failover method selected from the high availability configuration patterns as realizable, and a different system meeting the high availability requirements as a failover destination of a system concerned;
acquiring physical or logical configuration of the physical computer and storing it in configuration information; and
determining that the configuration information has changed,
wherein selecting a failover method meeting the high availability requirements again selects a failover method meeting the high availability requirements when the configuration information has changed,
wherein setting a different system meeting the high availability requirements as a failover destination of a system concerned includes setting a new failover destination when a failover destination indicated by the selected failover method is different from that before the configuration information has changed.

16. The cluster system failover method of claim 15, further comprising:
acquiring operation states of all systems as an operation history;
extracting an operation status corresponding to the high availability requirements from the operation history; and
updating the high availability configuration patterns when the operation status has changed,
wherein setting a different system meeting the high availability requirements as a failover destination of a system concerned again selects a failover destination meeting the high availability requirements, based on the updated high availability configuration patterns.

17. The cluster system failover method of claim 15, wherein setting failover requirements required at failure as high availability requirements includes requirements on operation costs of the entire physical computer.

* * * * *